US008971655B2

(12) United States Patent
Andersson et al.

(10) Patent No.: US 8,971,655 B2
(45) Date of Patent: Mar. 3, 2015

(54) METHOD AND APPARATUS FOR ENCODING AND DECODING OF IMAGES

(75) Inventors: Kenneth Andersson, Gavle (SE); Andrey Norkin, Solna (SE); Clinton Priddle, Indooroopilly (AU); Zhuangfei Wu, Solna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 253 days.

(21) Appl. No.: 13/383,346

(22) PCT Filed: Mar. 16, 2010

(86) PCT No.: PCT/SE2010/050286
§ 371 (c)(1),
(2), (4) Date: Mar. 20, 2012

(87) PCT Pub. No.: WO2011/010959
PCT Pub. Date: Jan. 27, 2011

(65) Prior Publication Data
US 2012/0170858 A1    Jul. 5, 2012

Related U.S. Application Data

(60) Provisional application No. 61/227,927, filed on Jul. 23, 2009.

(51) Int. Cl.
*G06K 9/36* (2006.01)
*H04N 19/14* (2014.01)
(Continued)

(52) U.S. Cl.
CPC ... *H04N 19/00157* (2013.01); *H04N 19/00109* (2013.01); *H04N 19/00278* (2013.01); *H04N 19/00175* (2013.01); *H04N 19/00206* (2013.01); *H04N 19/00545* (2013.01)
USPC ............................................. 382/239; 382/238

(58) Field of Classification Search
CPC .................................................. H04N 19/0083
See application file for complete search history.

(56) References Cited

U.S. PATENT DOCUMENTS

| 6,081,551 | A | 6/2000 | Etoh |
|---|---|---|---|
| 2003/0202592 | A1 | 10/2003 | Sohn et al. |

(Continued)

FOREIGN PATENT DOCUMENTS

EP     0 797 356 A2     9/1997

OTHER PUBLICATIONS

Robert et al., "Improving H.264 video coding through block oriented transforms," ICME 2008, pp. 705-708, Jun. 2008.*

(Continued)

*Primary Examiner* — Anand Bhatnagar
*Assistant Examiner* — Soo Park
(74) *Attorney, Agent, or Firm* — Myers Bigel Sibley & Sajovec, P.A.

(57) ABSTRACT

An encoding method for encoding of images and corresponding decoding method is disclosed, as well as an encoder and a decoder. The encoding method comprises creating, in an encoder, a residual block from an original block and a prediction block which is an approximation of the original block, wherein the created residual block comprises residual block elements. The en-coding method further comprises re-ordering, in the encoder, the residual block elements within the residual block; and applying, in the encoder, a transform to the re-ordered residual block. By re-ordering the residual block elements prior to applying a transform, an improved efficiency of the encoding may be obtained.

31 Claims, 11 Drawing Sheets

(51) Int. Cl.
H04N 19/129 (2014.01)
H04N 19/176 (2014.01)
H04N 19/147 (2014.01)
H04N 19/156 (2014.01)
H04N 19/46 (2014.01)

(56) References Cited

U.S. PATENT DOCUMENTS

2006/0088096 A1 4/2006 Han et al.
2008/0192825 A1* 8/2008 Lee et al. ................. 375/240.12
2008/0247658 A1 10/2008 Lee et al.
2008/0310512 A1* 12/2008 Ye et al. ................... 375/240.16

OTHER PUBLICATIONS

Wiegand et al,. "Rate-constrained coder control and comparison of video coding standards", TCSVT 2003, vol. 13, No. 7, pp. 688-703, 2003.*
Fan et al., "Fast e-dimensional 4x4 forward integer transform implementation for H.264/AVC", TCSII 2006, vol. 53, No. 3, pp. 174-177, 2006.*
International Search Report, PCT Application No. PCT/SE2010/050286, Oct. 28, 2010.
Written Opinion of the international Searching Authority, PCT Application No. PCT/SE2010/050286, Oct. 28, 2010.
International Preliminary Report on Patentability, PCT Application No. PCT/SE2010/050286, Aug. 8, 2011.
International Telecommunication Union, "Series H: Audiovisual and Multimedia System—Infrastructure of audiovisual services—Coding of moving video: Advanced video coding for generic audiovisual services", Standard H.264, Mar. 2009, 670 pp.
Sullivan et al., "Rate-Distortion Optimization for Video Compression", *IEEE Signal Processing Magazine*, Nov. 1998, pp. 74-90.
Sullivan et al., "The H.264/AVC Advanced Video Coding Standard: Overview and Introduction to the Fidelity Range Extension", *SPIE Conference on Applications of Digital Image Processing*, Paper No. 5558-53, Aug. 2004, 21 pp.
Chujoh et al., "Improvement of Block-based Adaptive Loop Filter", ITU—Telecommunications Standardization Sector, Study Group 16 Question 6, Video Coding Experts Group VCEG), Document VCEG-AJ13, 36$^{th}$ Meeting: San Diego, California Oct. 8-10, 2008, 4 pp.
English Translation of Chinese First Office Action—CN Application No. 201080033125.4, Mar. 3, 2014, 16 pp.
Antoine Robert et al.: "Improving H.264 Video Coding Through Block Oriented Transforms", 2008 IEEE, 705-708 pp.

* cited by examiner

Fig. 6a $$\begin{bmatrix} 60 & 60 & 60 & 60 \\ -60 & -60 & -60 & -60 \\ 0 & 0 & 0 & 0 \\ 0 & 0 & 0 & 0 \end{bmatrix} \Rightarrow \begin{bmatrix} 60 & 60 & 60 & 60 \\ 0 & 0 & 0 & 0 \\ 0 & 0 & 0 & 0 \\ -60 & -60 & -60 & -60 \end{bmatrix}$$

615  600     610        605

Fig. 6b $$\begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} \Rightarrow \begin{bmatrix} a_{11} & a_{12} & a_{13} & a_{14} \\ a_{31} & a_{32} & a_{33} & a_{34} \\ a_{21} & a_{22} & a_{23} & a_{24} \\ a_{41} & a_{42} & a_{43} & a_{44} \end{bmatrix}$$

600          610        605

Fig. 6c $$\begin{bmatrix} a & 0 & 0 & 0 \\ 0 & b & 0 & 0 \\ 0 & 0 & c & 0 \\ 0 & 0 & 0 & d \end{bmatrix} \Rightarrow \begin{bmatrix} 0 & a & 0 & 0 \\ 0 & b & 0 & 0 \\ 0 & c & 0 & 0 \\ 0 & d & 0 & 0 \end{bmatrix}$$

615  600       610        605

Fig. 6d $$\begin{bmatrix} a & e & f & g \\ h & b & i & j \\ k & l & c & m \\ n & o & p & d \end{bmatrix} \Rightarrow \begin{bmatrix} h & a & e & f \\ h & b & i & j \\ l & c & m & j \\ p & d & m & j \end{bmatrix} \Rightarrow \begin{bmatrix} a & e & f & 0 \\ h & b & i & j \\ 0 & l & c & m \\ 0 & 0 & p & d \end{bmatrix}$$

615  600     610        605        620        625

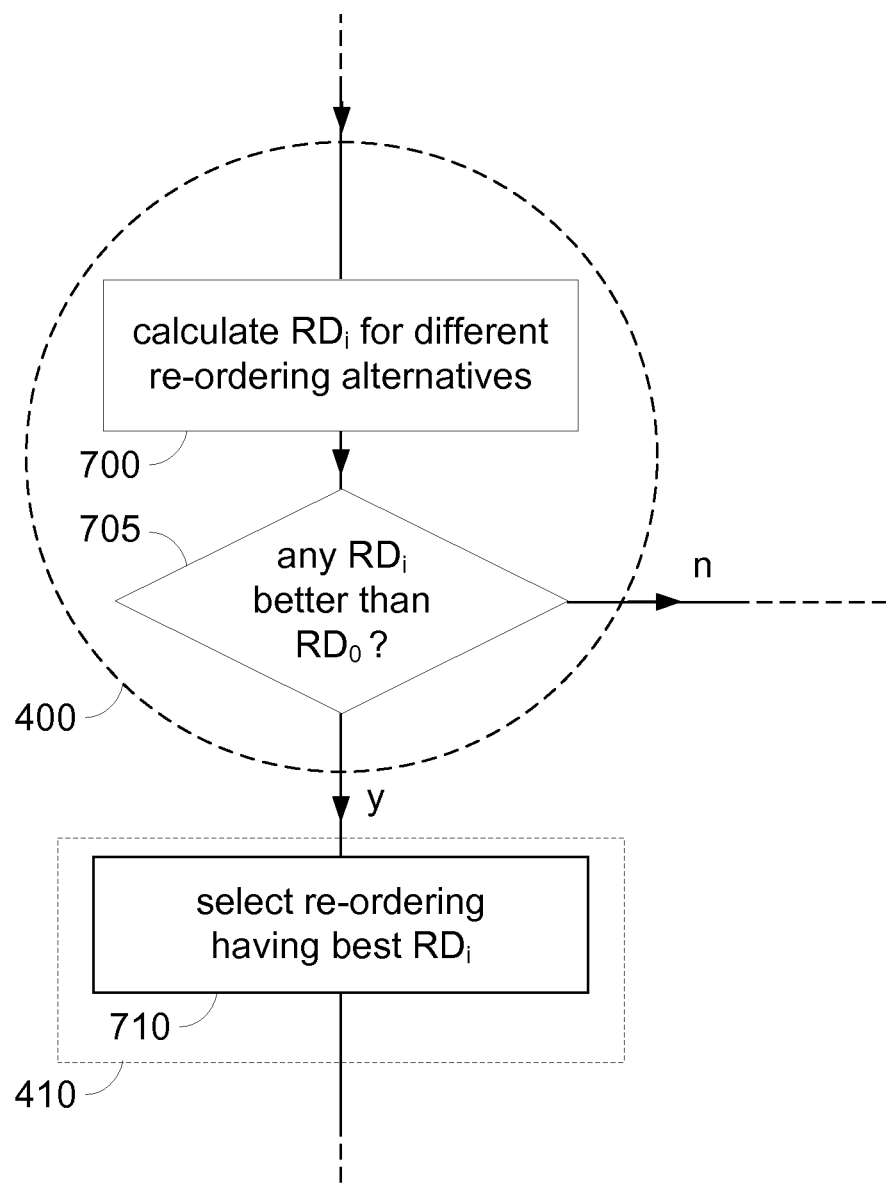

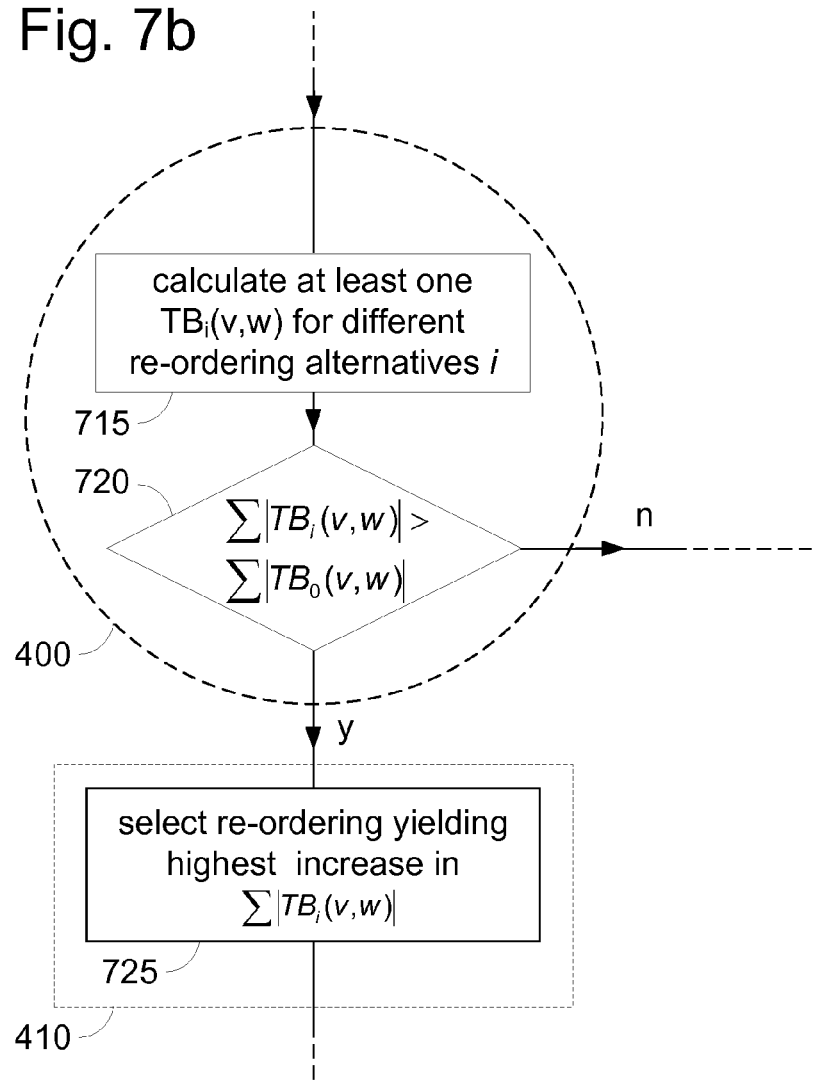

METHOD AND APPARATUS FOR ENCODING AND DECODING OF IMAGES

CROSS REFERENCE TO RELATED APPLICATIONS

This application is a 35 U.S.C. §371 national stage application of PCT International Application No. PCT/SE2010/050286, filed on 16 Mar. 2010, which itself claims priority to U.S. provisional Patent Application No. 61/227,927, filed 23 Jul. 2009, the disclosure and content of both of which are incorporated by reference herein in their entirety. The above-referenced PCT International Application was published in the English language as International Publication No. WO 2011/010959 A1 on 27 Jan. 2011.

TECHNICAL FIELD

The present invention relates to the field of encoding and decoding of media, and in particular to the encoding and decoding of images.

BACKGROUND

When encoding data representing a sequence of visual images, data is often compressed in a manner so that only the differences between images is encoded into encoded image data to be used by a decoder when reconstructing the images, rather than encoding the data describing the entire image for each image. Thus, encoded data to be used for reconstruction of an image, or a part of an image, will include references to other images in the sequence of images, or to other parts of the currently reconstructed image. Such references could for example include instructions on how to spatially translate parts of a previous image to obtain parts of the currently reconstructed image (referred to as Inter Prediction based coding), or instructions on how to alter a known part of the current image to obtain an unknown part of the currently reconstructed image (referred to as Intra Prediction based coding), etc. The image resulting from having followed such instructions will here be referred to as the prediction image, while the instructions on how to obtain the prediction image from already decoded information will be referred to as the prediction parameters (PP). The prediction parameters are provided to a decoder, while the prediction image is not.

Prediction parameters by which an image could be exactly predicted can oftentimes not be efficiently provided. In order to still arrive at an acceptable degree of compression, a prediction image, which is not an exact copy of the original image, is therefore typically accepted. In order to further improve the decoded image, a representation of the prediction error is often included in the encoded image data. A decoder can thus use information on the prediction error to improve a predicted image that has been obtained by use of the prediction parameters.

Typically, a visual image is divided into a number of blocks, where a prediction and information on the prediction error is encoded for each block. Such a block includes a suitable number of samples or pixels, for example 4×4, 8×8, 16×16, 4×8, or any other suitable number of pixels.

The prediction error can for example be represented by a residual block, where the residual block describes differences between the original block and the prediction block in a pixel-wise manner: For a pixel coordinate $(i, j)$, the residual block element $RB(i, j)$ is often defined as the difference between the original block element $OB(i,j)$ and the prediction block element $PB(i, j)$: $RB(i, j)=OB(i, j)-PB(i, j)$. The elements of an original block and a prediction block, and therefore also the elements of a residual block, typically represent the same time instant.

In order to exploit any remaining correlation between different samples in a residual block, spatial transforms are often applied on a residual block as part of the encoding procedure. Such application of a spatial transform will result in a transformed block (TB) comprising transformed coefficients, here referred to as TB coefficients. This transformed block, together with the prediction block and information on previous images, can be used to reconstruct an exact copy of the original image block. However, the representation of the transformed block often requires a large amount of bits, and the TB coefficients are therefore typically quantized and entropy coded as part of the encoding procedure. An example of a standard for encoding of audiovisual services which uses a spatial transform of residual blocks is the ITU-T standard H.264 of March 2009, *"Advanced video coding for generic audiovisual services"*. The H.264 standard, like many other encoding standards, uses for example the Discrete Cosine Transform (DCT).

The compression of media typically involves a trade-off between the degree of compression, the amount of distortion introduced by the compression and the computational resources required to compress and/or reconstruct the media. A high degree of compression will result in more efficient storage of the compressed media, as well as a smaller bandwidth requirement upon transmission of the media from the encoder to a decoder. However, a higher degree of compression often has the drawback of an increased amount of distortion, and/or an increase in the amount of computational resources required upon compression/reconstruction of the media.

Some spatial transforms, like the DCT, will, when applied to a signal wherein the samples are highly correlated, result in transformed blocks that can be more efficiently encoded than when the signal samples are less correlated. Thus, for highly correlated signals, an efficient compression can be obtained with a low amount of distortion. For poorly or negatively correlated signals, however, an accurate representation of the transformed block obtained by such spatial transforms typically requires a large amount of bits, thus reducing the compression efficiency (or the representation accuracy) of the encoding scheme. When high performance prediction tools are used, the elements of the residual block are often poorly or negatively correlated. In *"Integer Sine Transform for Inter Frame"*, ITU-T SG16/Q6, San Diego, Oct. 8-10, 2008, it has therefore been suggested that a transform coding scheme be employed wherein a selection is made between the integer cosine transform (ICT) and an integer sine transform (IST). The IST is more suitable for transformation of poorly correlated signals than the DCT or the ICT.

Although a transform coding scheme wherein one of the ICT and IST is selected depending on the correlation of the elements in a residual block may in some circumstances improve the degree of compression with maintained representation accuracy, such a scheme would require that both transforms be defined and implemented at both encoder and decoder. This typically increases the hardware requirements on the encoder and the decoder, making hardware optimization difficult. Typically, the required hardware will become both larger and more expensive.

SUMMARY

An object of the present invention is to provide image encoding with improved efficiency.

One embodiment provides an encoding method for encoding a representation of an image. The method comprises: creating, in an encoder, a residual block from an original block and a prediction block which is an approximation of the original block. The created residual block comprises residual block elements. The method further comprises re-ordering, in the encoder, the residual block elements within the residual block; and applying, in the encoder, a transform to the re-ordered residual block.

Another embodiment provides a decoding method for decoding of encoded image data representing an image. The decoding method comprises deriving, in a decoder, a transformed block from received encoded image data, where the transformed block originates from a transform having been applied, in an encoder, to an original residual block comprising residual block elements. The decoding method further comprises: deriving, in the decoder, a residual block by applying, to the transformed block, an inverse of said transform; performing, in the decoder, an inverse re-ordering of the residual block elements of the derived residual block, wherein a re-ordering has been performed on the original residual block in the encoder prior to applying the transform; and using, in the decoder, the inversely re-ordered residual block in a re-construction of an original block representing at least a part of an image.

The invention further relates to an encoder and a decoder. The encoder is adapted to encode a representation of an image into encoded image data, and comprises: an input configured to receive a signal indicative an original block representing at least a part of an image; a residual block generator, responsively connected to the input and programmably configured to generate a residual block using a received original block; a re-ordering mechanism, responsively connected to the residual block generator and programmably configured to re-order the residual block elements of a residual block, thereby creating a re-ordered residual block; a transform mechanism, responsively connected to the residual block generator and programmably configured to apply a transform to a received re-ordered residual block, thereby generating a transformed block to be used in the creation of the encoded image data; and an output connected to the transform mechanism and configured to deliver encoded image data.

The decoder is adapted to receive encoded image data representing an image having been encoded by an encoder. The decoder comprises: an input configured to receive encoded image data from which a transformed block may be derived, where the transformed block originates from a transform having been applied, in the encoder, to a residual block comprising residual block elements; an inverse transform mechanism responsively connected to receive a transformed block and programmably configured to apply an inverse of said transform to the transformed block in order to arrive at a residual block comprising residual block elements; an inverse re-ordering mechanism, responsively connected to the inverse transform mechanism and programmably configured to receive a residual block, to identify a re-ordering having been performed in the encoder on a corresponding original residual block, and to perform an inverse re-ordering to the received residual block, where the inverse re-ordering is associated with the re-ordering performed in the encoder, thereby generating an inversely re-ordered residual block; and an inverse prediction mechanism responsively connected to the inverse re-ordering mechanism and programmably configured to use an inversely re-ordered residual block in the reconstruction of a corresponding original block representing at least a part of an image.

The invention further relates to an encoder computer program and a decoder computer program.

By this technology is achieved that a residual block may be better mapped on the basis functions of a transform, thereby allowing for a more efficient encoding of an original block.

In an embodiment of the encoding method wherein the re-ordering is optional, the encoding method further comprises determining, in the encoder, prior to applying the transform to a residual block, whether or not a re-ordering of the residual block elements of the residual block should be performed. Hereby is achieved that the re-ordering is optional, and a greater adjustability of the encoding to the properties of the residual blocks is achieved, thereby improving the efficiency of the encoding.

In one embodiment, a set of available re-orderings are provided for in the encoder, so that the encoder can select a re-ordering in dependence of an analysis of the residual block. Hereby is achieved that the adjustability of the encoding is further improved. The analysis of the residual block can for example be performed by means of a rate-distortion analysis, or by an analysis of the energy distribution within the different transform blocks obtained by use of different re-ordering alternatives.

In one embodiment, the encoding method comprises scanning of the transformed block coefficients in order to form a vector of transformed coefficients; wherein the scanning path is selected in dependence of the re-ordering performed on the residual block. Hereby is achieved that a re-ordering/scanning-order combination which yields a high probability of consecutive zeros in the vector of transformed coefficients can be obtained, thus further improving the efficiency of the encoding. In this embodiment, the decoding method further comprises selecting an inverse scanning in dependence of the re-ordering having been performed by the encoder.

The encoding method could include the generation of a signal indicative of the performed re-ordering. Hereby is achieved that the decoder can be informed of which re-ordering has been performed. The decoding process can therefore be adjusted to the re-ordering used.

In one embodiment, the generated signal can, if desired, include an indication of a set of consecutive residual blocks that have been re-ordered by use of the same re-ordering. Hereby is achieved that the encoding efficiency is further improved, since a re-ordering indication does not have to be provided for each residual block.

In one embodiment the decoding method further comprises setting the value of at least one residual block element of the residual block to a constant value prior to using the residual block in the reconstruction of the original block. Hereby is achieved that unwanted ringing, introduced by the data processing, can be efficiently reduced.

Further aspects of the invention are set out in the following detailed description and in the accompanying claims.

BRIEF DESCRIPTION OF THE DRAWINGS

FIG. 5 is a schematic illustration of encoded image data.

FIGS. 6a-d illustrate different examples of re-orderings of a 4×4 residual block.

FIG. 7a is a flowchart schematically illustrating re-ordering selection by means of rate-distortion optimization.

FIG. 7b is a flowchart schematically illustrating re-ordering selection by means of an evaluation based on transform block coefficient energy.

FIGS. 8a-b illustrate different examples of scanning paths applied when scanning a transformed block.

FIG. 11 is a schematic illustration of an embodiment of a decoder configured to decode encoded image data to which

DETAILED DESCRIPTION

Figure 1:
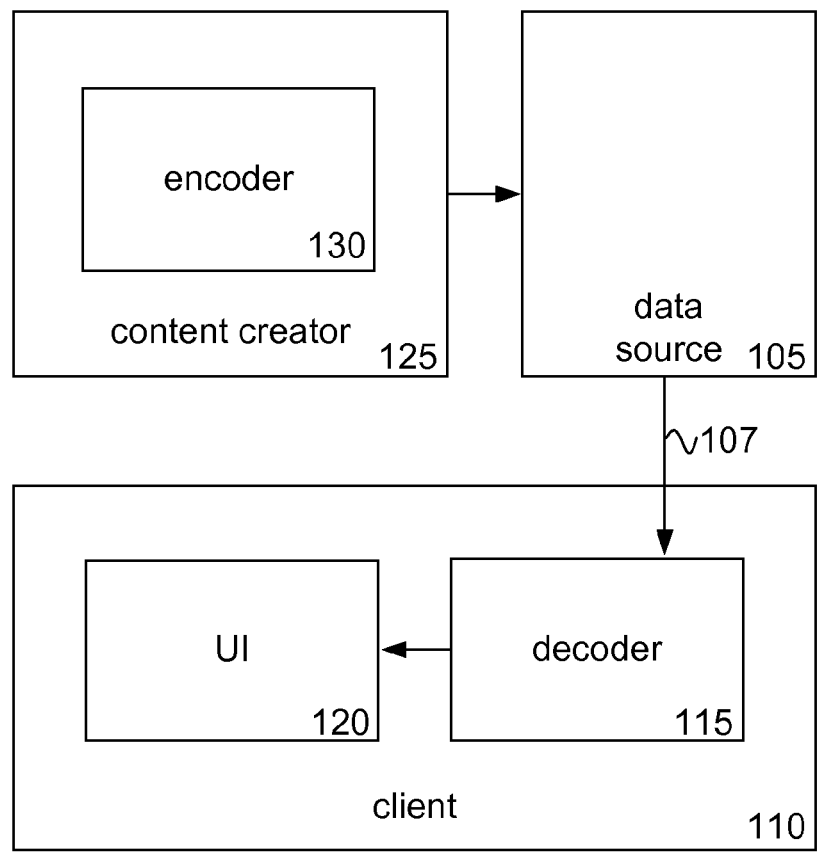
FIG. 1 is a schematic illustration of a media communications system.

FIG. 1 schematically illustrates an example of a media communications system 100, comprising a data source 105 and a client 110 which can communicate over a connection 107. Client 110 comprises a decoder 115 for decoding of a media representation received in the form of encoded image data, which may for example have been provided by the data source 105. Hence, by means of the decoder 115, media can be re-constructed from encoded image data representing the media. Client 110 can also be associated with a device 120 for processing of the decoded information, such as a user interface or an application.

The media represented by the encoded image data typically includes at least one visual image in the form of video, synthetic video, single images, or any other form of visual images. The media may or may not include further media forms such as audio, multimedia, interactive multimedia representations etc. A visual part of the media at a particular point in time will in the following be referred to as an image.

Connection 107 can for example be a radio connection. The connection 107 may alternatively be a wired connection, or a combination of wired and wireless. Furthermore, the connection 107 will often be realized by means of additional nodes interconnecting the data source 105 and the client 110, such as a radio base station and/or nodes providing connectivity to the Internet. An example of a communications system 100 wherein the connection 107 is a direct connection is a system 100 wherein the data source 105 is a DVD disc and the client 110 is a DVD player.

Communications system 100 of FIG. 1 is also shown to include a content creator 125. Content creator 125 is adapted to create the encoded image data to be transmitted to the client 110 from data representing the media to be presented at a user interface/application 120. The content creator 125 can typically include such encoded image data in a file, a data stream, or similar.

Content creator 125 typically comprises an encoder 130 for encoding media into encoded image data wherein the encoded image data is typically of a compressed format. In some implementations of the invention, the content creator 125 is completely separate from the data source 105, as in the DVD example given above. In other implementations, the content creator 125 may form part of the data source 105, as may be the case in real-time streaming of data.

Figure 2:
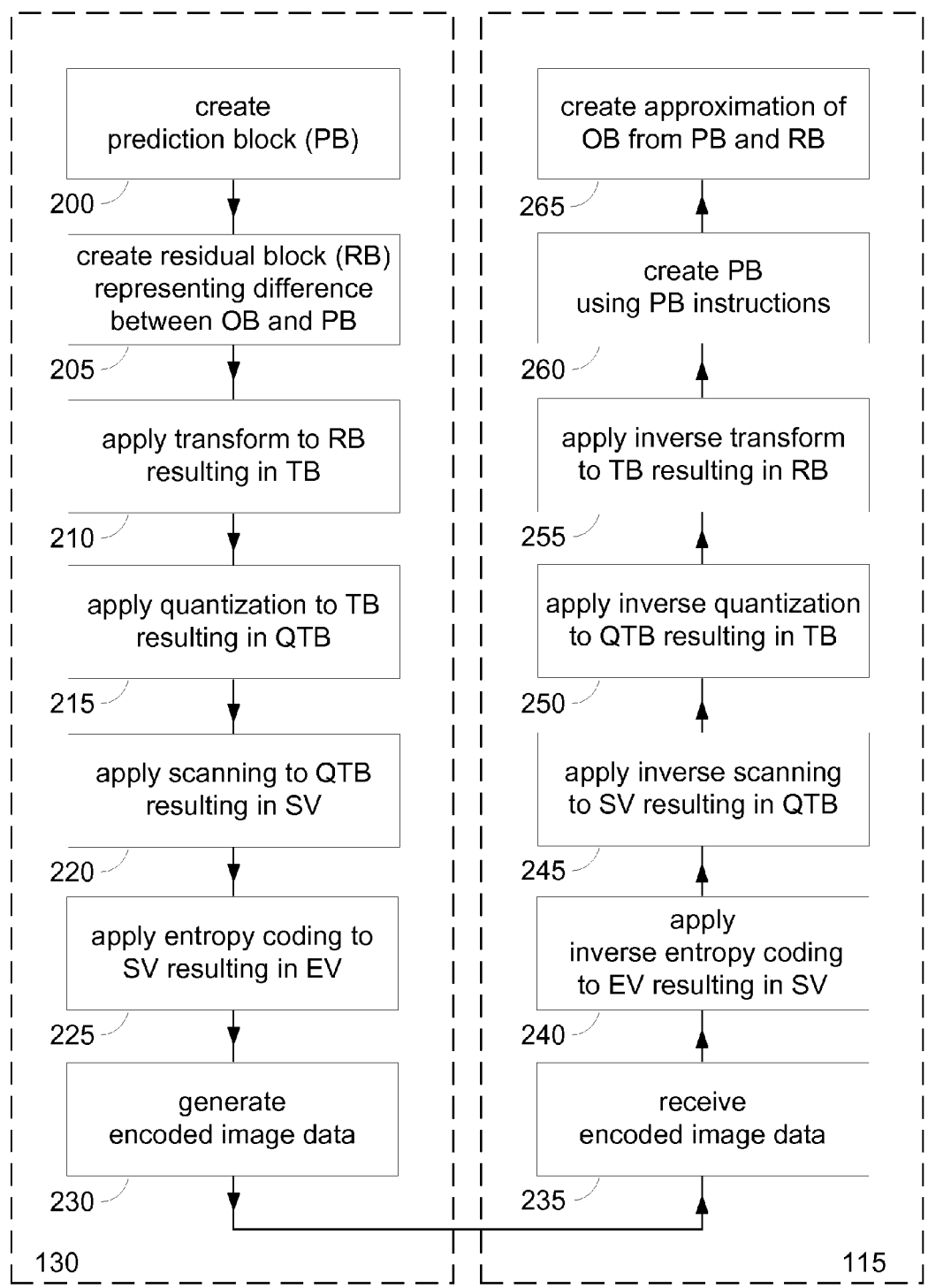
FIG. 2 is a flowchart illustrating an embodiment of an encoding method and a corresponding decoding method.

In FIG. 2 are shown different steps taken by an example of an embodiment of an encoder 130 in the encoding of an image, as well as corresponding steps taken by a corresponding decoder 115 in the decoding of the encoded image. At step 200, a prediction block (PB) is created from previous image(s), and/or from other parts of the image which have previously been encoded. In step 205, a residual block (RB), representing the difference between the current original block (OB) and the PB, is created, where the OB represents at least a part of the original image to be encoded. Furthermore, instructions (here referred to as prediction parameters) are generated on how to create the prediction block PB from previous image(s), and/or from other parts of the image which have previously been encoded.

At step 210, a transform is applied to the RB in order to de-correlate the RB so that the RB can be represented by a smaller set of values than in the untransformed form. A transform is essentially a function that translates the RB into another domain, e.g. the frequency domain, where the RB can be represented more efficiently. The transform can for example be a spatial transform, such as the DCT, DST, IST, ICT as described above, a 3D temporal transform which also includes the time dimension, or specific KLTs (Karhunen, Loeve Transforms), e.g. transforms which are optimal in some respects. A transform typically has orthogonal basis functions, although non-orthogonal basis functions may also be applied. Furthermore, a transforms is typically separable, meaning that the transform can be applied first in one direction, and then in orthogonal directions, although non-separable transforms can also be applied. Applying the transform to the RB in step 210 results in a transformed block, here denoted TB, comprising TB coefficients.

In step 215, quantization of the TB coefficients is performed, resulting in a quantized transformed block, here denoted QTB. In step 220, QTB is then scanned, the scanning resulting in a vector of quantized transform coefficients SV. The scan ordering is typically designed to order the highest-variance coefficients first and to maximize the number of consecutive zero-valued coefficients appearing in SV. In step 220, SV is then entropy encoded, resulting in an entropy encoded bit-stream EB. The entropy encoding can for example be based on variable length coding (VLC), binary arithmetic coding (BAC), context adaptive VLC (CAVLC) or context adaptive BAC (CABAC). At step 230, encoded image data including, the entropy encoded bit-stream EB, as well as the prediction parameters, is generated and typically delivered at an output of the encoder 130. In the general case, such encoded image data includes information indicative of the encoded residual block (here: the entropy encoded bit-stream EB), as well as the prediction parameters. Depending on which steps have been taken by the decoder 130 in decoding of RB, the encoded image data can be of different formats. As a special case, the encoded image data does not have to include any information relating to the encoded RB if the encoded RB carries no information—this is further discussed in relation to FIG. 5.

Upon receipt of the encoded image data in step 235, the decoder 115 applies, in the reverse order, the inverse of steps 210-235 in the corresponding steps 240-255, thus re-constructing (an approximation of) the residual block RB at step 255. At the same time, or before/after, (an approximation of) the prediction block PB is re-created at step 260 using the prediction parameters received at step 235 together with previously decoded original block(s) OB. In step 265, (an approximation of) the original block OB is re-created using the combination of the PB re-created in step 260 and the RB re-created in step 255.

FIG. 2 illustrates an example only of encoding and decoding processes, and alternative procedures may be employed. For examples, some or all of steps 215-225 (and corresponding steps 240-250) could be omitted. Examples of known encoding and decoding processes are for example described in "The *H.264/AVC Advanced Video Coding Standard: Overview and Introduction to the Fidelity Range Extensions*", presented at the SPIE Conference on Applications of Digital Image Processing XXVII, Special Session on Advances in the New Emerging Standard: H.264/AVC, August 2004.

As discussed above, a transform used for the transformation of a residual block which is efficient when applied to a residual block having highly correlated RB elements, also referred to as pixels, is typically less efficient when applied to a residual block having less correlated RB elements. Hence, a single transform can generally not provide for efficient transformation of both correlated and uncorrelated residual blocks. To implement two or more transforms in the encoder, as well as in the decoder, is costly in terms of hardware and software.

However, by re-arranging the RB elements of a less correlated residual block, prior to applying the transform in step 210, an efficient encoding can be achieved using a transform which would otherwise be better suited for highly correlated residual blocks. Similarly, by re-arranging the RB elements of a highly correlated residual block, prior to applying the transform in step 210, a more efficient encoding can be achieved by use of a transform which would otherwise be better suited for poorly correlated residual blocks.

Figure 3:
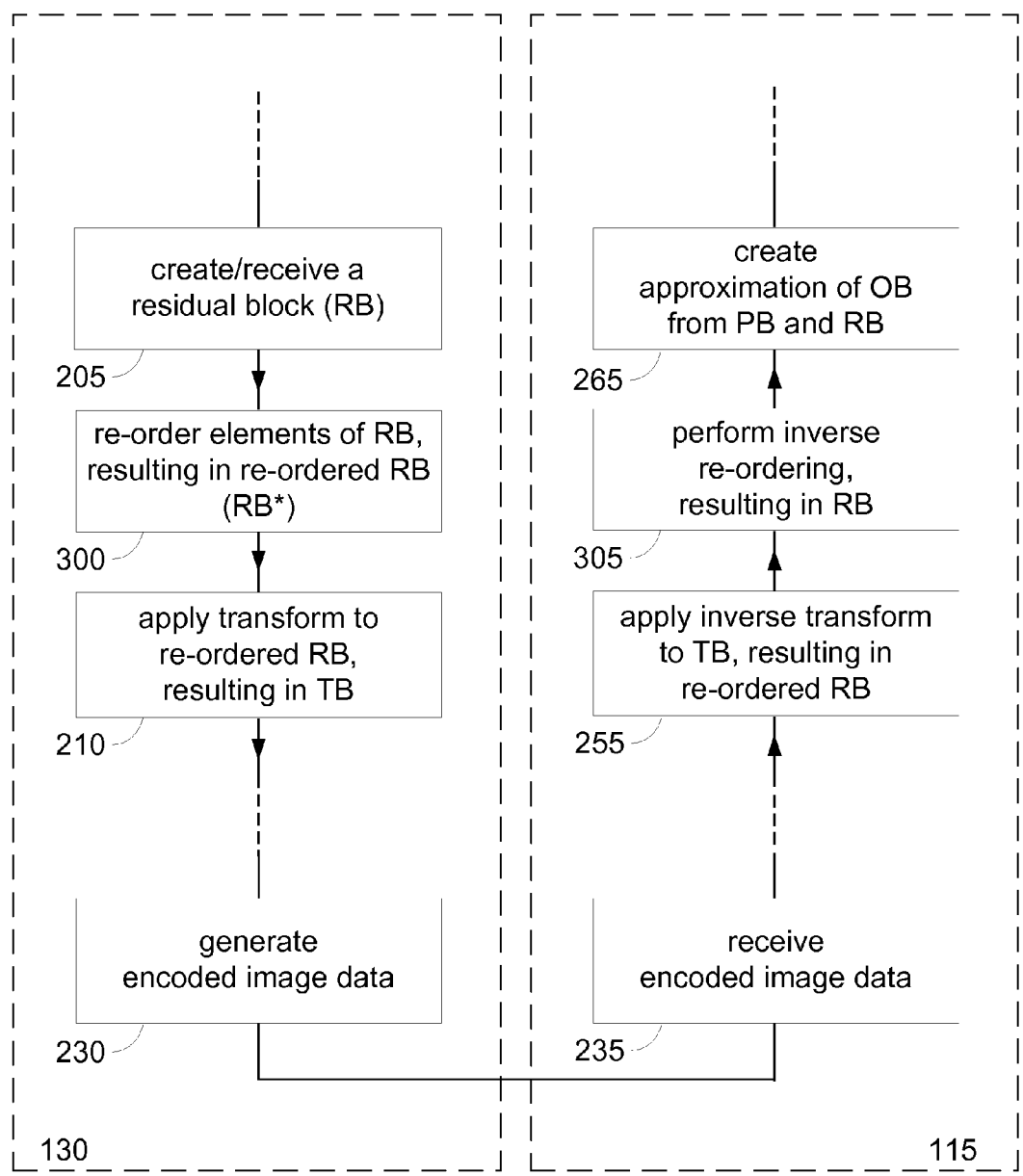
FIG. 3 is a flowchart illustrating an embodiment of an encoding method comprising re-ordering of a residual block and a corresponding decoding method comprising inverse re-ordering of a residual block.

An embodiment of this method, as applied to the encoding process, as well as the decoding process, is schematically illustrated in FIG. 3. In step 205, a residual block RB is created or received in the encoder 130. This step could for example be preceded by step 200 of FIG. 2.

Step 300 is then entered, wherein RB elements of the RB are re-ordered, resulting in a re-ordered RB. The RB elements are preferably re-ordered in a manner so that the re-ordered residual block can be more efficiently encoded, as described below. In step 210, the transform is applied to the re-ordered RB. Further steps, such as steps 215-225, could be performed in the encoder 130 before generating the encoded image data to be provided to the decoder 115, depending on encoding procedure. The encoded image data comprises information by means of which the decoder can re-construct the RB, (e.g. an entropy encoded bit-stream EB, if steps 215-225 have been performed), as well as information on how the prediction block can be obtained from previous images/parts of images.

In the decoder 115, corresponding steps are performed upon receipt of the encoded image data generated by the encoder 130. If steps 215-225 were performed by the encoder, steps 240-250 are performed by the decoder 115, prior to entering step 255 wherein the inverse transform is applied to the transformed block TB. Since the transform was applied to the re-ordered residual block in corresponding step 210 in the encoder 130, step 255 in this method results in the re-ordered residual block RB (or rather, in the re-constructed re-ordered residual block, RB, which is an approximation of the re-ordered residual block. However, for ease of description, the inverse encoding steps performed by the decoder 115 will in the following be assumed to reconstruct the data which was encoded in the encoder 130).

At step 305 performed in the decoder 115, the inverse of the re-ordering of step 300 is performed, so that of the residual block RB is achieved. This residual block can then be used in step 265, together with the corresponding prediction block, to re-create the original block OB.

By introducing the possibility of re-ordering of the RB elements of a residual block, the properties of the residual block can be adjusted to the applied transform, so that a high encoding efficiency is achieved without the introduction of a different transform. In fact, re-ordering of the RB elements of a residual block prior to applying a particular transform can achieve a result similar to, or equal to, applying a different transform to the original, un-re-ordered, residual block, and a certain re-ordering could for example be used in combination with a particular transform to approximate another transform.

Hence, by introducing the possibility of selecting, in the encoder 130, whether or not a re-ordering of the residual block should be performed, an effect similar to that achieved by implementing different transforms can be obtained while using a single transform. In one embodiment, a set of different re-orderings are available for selection by the encoder 130, and a selection of one re-ordering from the set can be based on an analysis of the residual block.

Figure 4:
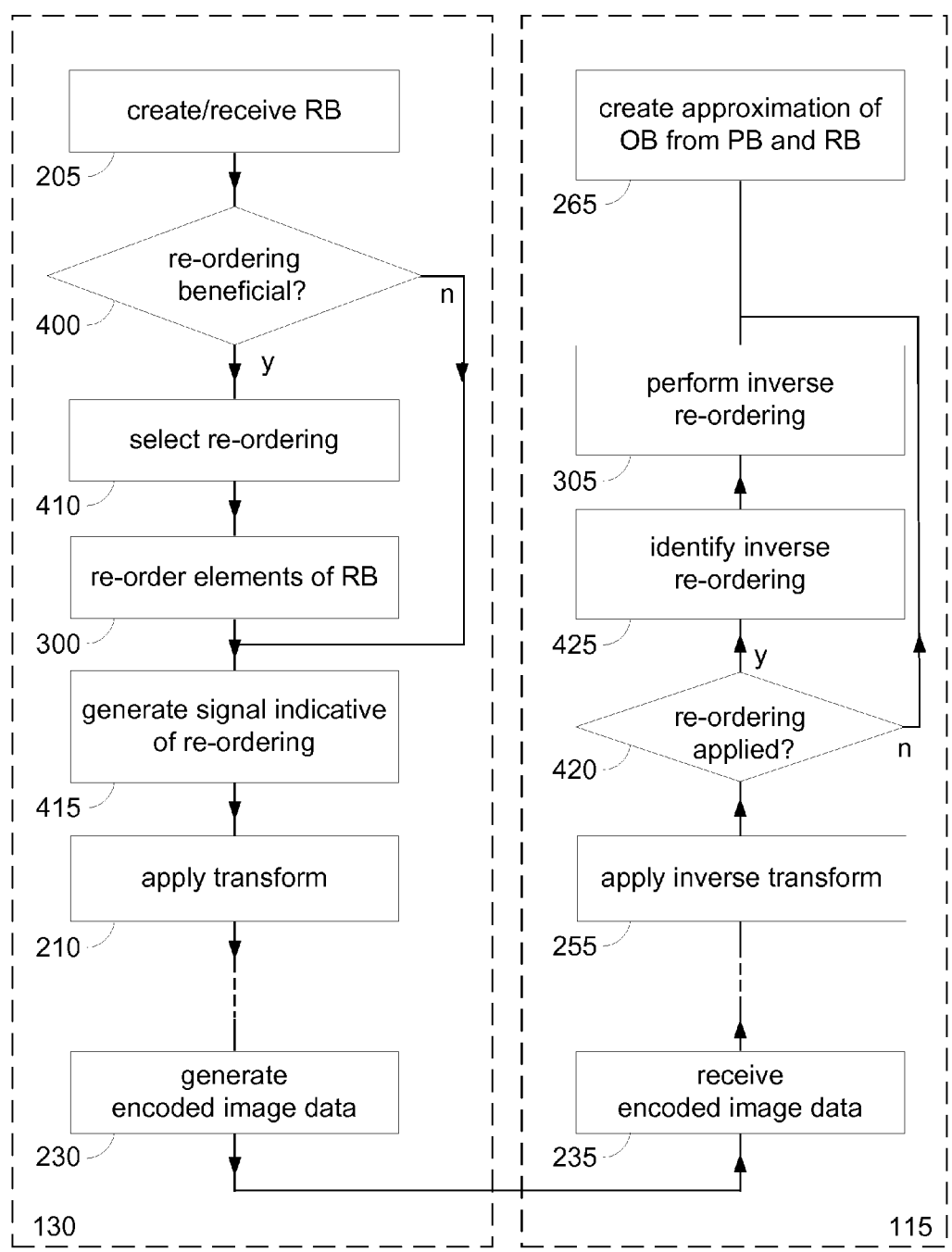
FIG. 4 is a flowchart illustrating an embodiment of the encoding method and decoding method of FIG. 3.

In FIG. 4, an embodiment of the method of FIG. 3 is shown wherein the encoder 130 can determine whether or not a re-ordering should be performed, and if so, select a suitable re-ordering. The determination and selection can be based on an analysis of the properties of the RB.

In step 205 of FIG. 4, a RB is created or received by the encoder 130. In step 400, the RB is analyzed in order to determine whether a re-ordering of the RB elements would be beneficial. Examples of how this step can be implemented are discussed in relation to FIG. 7. If it is determined that a re-ordering would be beneficial, step 410 is entered, wherein a suitable re-ordering is selected. Although steps 400 and 410 are here shown as two separate steps for purposes of illustration, steps 400 and 410 are often performed as one step. In step 300, the selected re-ordering is performed, resulting in a re-ordered RB. In step 415, a signal indicative of the re-ordering is generated, so that the decoder 115 can be informed of which re-ordering has been performed. In step 210, the transform is applied to the re-ordered RB. Further steps, such as steps 215-225 of FIG. 2, are typically performed prior to generating, in step 230, the encoded image data to be provided to the decoder 115. In the following, it will be assumed that the signal generated in step 415 is included in the encoded image data, so that the signal generated in step 415 is conveyed to the decoder 115 together with the signal indicative of the RB and the signal indicative of the prediction parameters. Alternatively, the signal generated in step 415 is transmitted separately.

If it is determined in step 400 that a re-ordering of RB should not be performed, then step 415 is entered directly after step 400. In step 415, a signal is then typically generated which is indicative of the fact that no re-ordering has been applied by the encoder 130.

At step 235, the encoded image data is received by the decoder. At step 255, typically after steps 240-250 have been performed, the inverse transform is applied to the transformed block TB, resulting in a (possibly re-ordered) residual block. In step 420 it is determined, from the signal generated in step 415 which was received by the decoder at step 235, whether a re-ordering was applied by the encoder 130. If not, the result achieved from applying the inverse transform in step 255 corresponds to the residual block RB, and step 265, where RB is used in the re-construction of the original block OB, can be performed directly. However, if it is found in step 420 that a re-ordering of the RB elements of the RB has been performed by the encoder 130, then the inverse of this re-ordering has to be applied to the result achieved in step 255, which corresponds to the re-ordered RB. In step 425, it is determined which re-ordering has been performed by the encoder 130, and in step 305, the inverse of this re-ordering is applied to the result achieved in step 255. Step 265 can then be entered.

In an implementation of the method shown in FIG. 4 wherein only one re-ordering is available to the encoder 130, steps 410 and 425 could advantageously be omitted. In an implementation wherein several different re-orderings are available, steps 400 and 410 (as well as steps 420 and 425) could be performed as one step. In such an implementation, "no re-ordering" could be seen as a special case of a re-ordering which is selectable in step 410 (and determined as a re-ordering in step 425). In an implementation wherein step 400 (and step 420) is performed as a separate step, on the other hand, step 415 could be skipped in the case where no re-ordering is to be performed—the decoder 115 could be configured to assume that no re-ordering has been performed by the encoder 130 if no signal indicative of a re-ordering has been received.

FIG. 5 shows an example of encoded image data 500 generated at step 230 in an embodiment of the method shown in FIG. 4. Encoded image data 500 is typically generated as part of a file, message or data stream comprising encoded image data relating to further original blocks, or could be stored/transmitted as an encoded image data 500 relating to a single block only. The encoded image data 500 of FIG. 5 includes four different data fields: a Prediction Parameter (PP) field 505, a Coded Bit Pattern field (CBP) 510, a Pixel Re-ordering Processing (PRP) field 515 and an Encoded Residual (ER) field 520. In PP field 505, an indication of the prediction parameters is given. In CBP field 510, an indication is provided as to whether or not an encoded residual block is included in the encoded image data 500. If the encoded image data 500 carries re-construction information relating to a plurality of original blocks, the CBP field 510 can include information relating to for which original blocks encoded RBs have been included. When the prediction performed in step 200 is successful in that an encoded residual block would carry no information. The encoded data information 500 would typically not include data fields 515 and 520, while an indication of this fact would be included in CBP field 510. The CBP field 510 of encoded image data 500 could be omitted, if desired, thus omitting the possibility of reducing the bandwidth utilization when the encoded RB carries no information.

In the encoded image data 500 shown in FIG. 5, it is assumed that an encoded RB is enclosed in ER field 520. This field could for example include an entropy encoded bitstream EB as obtained in step 225 above. Encoded image data 500 of FIG. 5 further includes a PRP field 515. This field is used to convey a PRP index from the encoder 130 to the decoder 115, the PRP index being indicative of which re-ordering (if any) has been applied to the RB in the encoder 130. If only one re-ordering is available to the encoder 130, the PRP index could be a flag, indicating whether or not the re-ordering has been applied. In implementations where several different re-orderings are available, different values of the PRP index could be used to refer to different re-orderings. In an implementation where all possible re-orderings are allowed, the PRP field 515 could include explicit information on the re-ordering performed by the encoder 130.

In an implementation where the same re-ordering is used for all RBs, no PRP field 515 is required. No PRP field 515 would be required, or a simple PRP flag could be employed, if the re-ordering to be applied is selected in dependence on another encoding parameter, which is signaled to the decoder by other means. Such other encoding parameter in dependence on which the re-ordering could be selected could for example be the prediction mode. Some prediction modes have a property to often create characteristic patterns within the residual block—an intra prediction by extrapolation in one direction, for example, often creates RB elements of significant magnitude along the direction orthogonal to the extrapolation direction. If a characteristic pattern in the RB is often generated by a particular prediction mode, it may in some implementations be advantageous to apply the same re-ordering to all RBs having been created by the particular prediction mode (or to make only one re-ordering available to such RB, while including the option of applying no re-ordering at all).

Steps 420 and 425 of FIG. 4 could for example be implemented by retrieving the PRP index from the PRP field 515 of encoded image data 500, and by identifying an inverse re-ordering corresponding to the PRP index, for example by means of a table or an "if-clause" of a computer program: "If PRP index takes the value Z, then perform inverse re-ordering Y". In an implementation wherein the re-ordering can be selected in dependence on another encoding parameter, e.g. the prediction mode, step 425 could be implemented by retrieving an index indicative of the prediction mode used for the RB, and by identifying an inverse re-ordering associated with this index.

As mentioned above, re-ordering of RB elements of an RB, prior to applying the transform to the RB, can in some circumstances reduce the number of bits required to describe the encoded RB. Examples of different re-orderings will be given in FIGS. 6a-6d.

A re-ordering could for example be applied to achieve a re-ordered RB which has a higher correlation between nearby residual elements than the correlation between nearby residual elements in the original RB. For example, a re-ordering could be applied to achieve a re-ordered RB having either rows, or columns, within which the variation of the magnitude of the RB elements is small. This could for example be beneficial if the transform to be applied is suitable for RBs with a high correlation between residual elements in row or column direction, and typically results in an increased number of TB coefficients having low energy for such transforms. A re-ordering could alternatively/additionally be applied to achieve a separation of rows or columns having RB elements of considerably different magnitude in order to influence the location of the high energy TB coefficients within the TB, typically to arrive at a TB suitable for the applicable scanning order.

One example of a re-ordering type is the row (column) re-arrangement re-ordering, where the rows (columns) are re-arranged within the RB. A number of different row (column) re-arrangement re-orderings are possible. Such re-orderings can for example be applied to separate rows (columns) having RB elements of considerably different magnitude, or non-zero RB elements of considerably different magnitude. In FIG. 6a, one row re-arrangement re-ordering is shown whereby the second row and the last row of the original residual block 600 have changed places in the re-ordered RB 605. The arrow 610 illustrates the re-ordering procedure, while reference numeral 615 points to a (random) RB element.

Another example of a row re-arrangement re-ordering of an RB 600 is shown in FIG. 6b. In this re-ordering, the odd and even rows are separated, so that rows 1 & 3 appear before rows 2 & 4 in the re-ordered RB 605. This can be described as if the even rows are first removed from the RB 600, the odd rows are moved up to be adjacent to each other in ascending order in the top half of the re-ordered RB 605, and the odd rows are returned, in ascending order, to the RB 605 in the empty positions below the odd rows. This type of re-ordering is typically beneficial if there is a considerable difference between the magnitude of the RB elements 615 of the odd rows and the magnitude of the RB elements 615 of the even rows within the original RB 600.

Another type of re-ordering is the row-wise (column-wise) displacement re-ordering, whereby RB elements 615 are displaced internally within a row (column). Such re-ordering can for example be applied to reduce the variation of the magnitude of the RB elements 615 within one or more rows (columns) of the RB. An example of a row-wise displacement re-ordering is shown in FIG. 6c. Here, a clock wise 45 degree rotation is performed, whereby the RB elements 615 of a diagonal of a residual block 600 are re-ordered to appear along the second column of the re-ordered residual block 605. Rotation of a smaller angle can be obtained by use of smaller displacements of the RB elements 615. For a clock wise 45 degree rotation, the row, which includes an RB element 615 which is part of both the diagonal and the column to which the diagonal is to be moved, is left untouched. The RB elements 615 of the next row below are displaced one step to the left, the RB elements 615 of the next row up are displaced one step to the right, the RB elements 615 of the second next row below are shifted two steps to the left etc. This type of re-ordering can be useful if a diagonal of the original residual block 600 comprises several RB elements 615 with magnitudes which differ considerably from the magnitudes of the neighbouring RB elements 615. A counter clock wise 45 degree rotation can be performed in a similar manner by performing the row-wise (column-wise) displacements in the opposite directions.

In the row-wise displacement re-ordering shown in FIG. 6c, the RB elements leaving one end of a row due to RB element displacement have been entered to fill the RB element position which has become empty, due to the displacement, at the other end of the row. This type of displacement re-ordering, here referred to as a displacement re-ordering with circular filling, can for example be suitable for high-rate encodings of low loss. For low rate encodings when the quantization is coarse, such circular filling may however cause some artifacts. In low rate encoding circumstances, a different filling operation may therefore be preferable.

An example of a row-wise displacement re-ordering 610 with a filling operation referred to as vertical filling is illustrated by an example given in FIG. 6d. The displacement re-ordering of FIG. 6d corresponds to a clock-wise 45 degree rotation, where the left part of a row, which has become empty due to the displacement, has been filled with the value from the row below, and the right part of a row, which has become empty due to the displacement, has been filled with a value from the row above. For a column-wise displacement re-ordering, a corresponding horizontal filling operation can be applied. The purpose of such vertical (horizontal) filling operation upon a row-wise (column-wise) displacement re-ordering is to increase the correlation between RB elements 615 in the vertical (horizontal) direction before transformation.

In the re-ordering shown in FIG. 6d, some of the RB elements 615 will not be transmitted to the decoder 115, and are therefore unknown upon decoding. Upon inverse re-ordering, the RB elements 615 will be displaced in the opposite direction to the displacement performed upon re-ordering. However, the original RB element 615 of the positions which will become empty due to such opposite direction displacement will be unknown. A constant value could for example be used to fill such empty positions. The constant value can for example be zero, or correspond to the average of the RB elements 615 before inverse re-ordering. In the example shown in FIG. 6d, the inverse re-ordering, illustrated by arrow 620, includes a constant value filling operation where the constant value is zero.

In some cases, it can be desired to maintain the average value of the residual block after re-ordering/inverse re-ordering. In this case, a constant value filling operation can be used in both the re-ordering and inverse re-ordering step, where the constant value can for example be the average of the residual elements 615 before re-ordering/inverse re-ordering.

A re-ordering could be followed by a transposing action, creating the transpose of the re-ordered re-ordered RB, if this would result in an improved mapping to the basis functions of the transform. A corresponding transposing action would then be performed in relation to the inverse re-ordering.

The examples given in FIGS. 6a-6d are shown in relation to a 4×4 residual block 600. However, the shown re-orderings can easily be generalized to a residual block 600 of any size, such as for example 8×4, 4×8, 8×8, 8×16, 16×8, 16×16, 32×32, 64×64, etc.

Other efficient re-orderings can also be defined. In a larger residual block 600, it may for example sometimes be beneficial to group rows (columns) two by two (or three by three, etc), and then separate the "odd pairs" from the "even pairs" in a fashion similar to the re-ordering separation of "odd single rows" It should be noted that a counter clock wise 45 degree rotation can be performed similarly but in that case with the row-wise (column-wise) displacements in the opposite directions from "even single rows" performed in FIG. 6b.

A transform matrix corresponds to a set of basis functions. When the transform is spatial, the basis functions $B_{v,w}$ are two dimensional, each having coefficients $B_{v,w}(i,j)$, where different basis functions are given for $v=1, \ldots, m$ and $w=1, \ldots n$, m and n being the number of rows and columns of the transform matrix, respectively.

One principle which may be used to achieve an efficient encoding of the RB is to re-order the RB elements to better map onto at least one of the basis functions of the transform. A good mapping is achieved by a re-ordering of the resource block if the re-ordering results in fewer non-zero transform coefficients in the quantized transformed block QTB than if no re-ordering had been performed—generally, the fewer non-zero coefficients, the better, since coefficients of value zero may not have to be encoded. Non-zero values of the transformed block which have an absolute magnitude below a certain threshold will be zeroed by the quantization, and thus, a good mapping in terms of the transformed block TB, prior to quantization, results in few transform coefficients having an absolute magnitude above this threshold, which is here referred to as the quantization threshold.

A further advantage of concentrating the TB energy to fewer transform coefficients is that less information will be lost in the quantization of the TB.

The location of the non-zero coefficients within the transformed block TB is typically also of interest. If there are long runs of QTB-coefficients of zero value in the direction of the scan of step 220 of FIG. 2, the entropy coding (cf. step 225 of FIG. 2) can be efficiently performed. Hence, a quantized transform block, having few non-zero coefficients and wherein the non-zero coefficients are localized near each other in the direction of the scan, is generally desired. Furthermore, if the non-zero coefficients occur in similar positions from TB to TB, then the entropy encoding applied can be such that smaller code words can be assigned to the coefficient for which the probability of a non-zero coefficient value is higher. Oftentimes, the probability of non-zero TB coefficient values is higher for low frequency coefficients than for high frequency coefficients, and it may therefore be beneficial to apply re-orderings striving to concentrate the TB energy to the low frequency TB coefficients.

There are a large number of re-orderings that can be applied to a residual block—namely (n×m)! different re-orderings if the RB is an n×m matrix. In an implementation of an encoder 130, the number of different re-orderings made available for selection by the encoder 130 in step 410 of FIG. 4 can for example depend on the expected variation of the RB element correlation between different residual blocks 600. If residual blocks 600 of many different types of correlations are to be expected, it might be advantageous to provide the encoder 130 with the possibility of selecting from a larger number of re-orderings. However, a larger number of available re-orderings will require more bits to represent the selected re-ordering in the encoded image data 500 to be provided to the decoder 115 (cf. the PRP field 515 of FIG. 5). Furthermore, comparing the benefits of different available re-orderings, in the selection step 410 of FIG. 4, typically requires more processing power/processing time if there are a higher number of available re-orderings. Typically, a lower number of re-orderings could be available to an encoder 130 operating in a real-time situation than if the encoding is performed in advance of transmission of the encoded image data 500 to the decoder 115.

The analysis performed in steps 400 and 410 of which available re-ordering is beneficial, if any, can for example be performed by means of rate distortion optimization. Rate-distortion (RD) optimization is a method whereby the benefits of an encoding alternative are compared with the drawback of the increased bit requirement if the encoding alternative is employed. The encoding alternative having the most desirable relationship between increased bit requirements ("rate") and distortion of the original image is then selected. A rate-distortion index $RD_i$ for a particular available re-ordering i can be described as:

$$RD_i = \lambda B_i + ssd_i \quad (1),$$

where $B_i$ represents the bit requirement of re-ordering i, and $ssd_i$ represents the sum of squared differences between the original block OB and the re-constructed original block obtained in step 265 of FIGS. 3 and 4 (where $B_i$ includes both bits for representing the encoded residual and for representing the re-ordering, if any). $\lambda$ is a parameter scaling the importance of the low-bit-requirement to the importance of a good reconstruction. The rate-distortion index of encoding without performing any re-ordering of the RB elements 615, here referred to as $RD_0$, is typically also calculated and compared to the $RD_i$ of the available re-orderings—this can be seen as a special "no-re-ordering" re-ordering alternative. A further description of rate-distortion optimization, including a description of the generation of an ssd-value, is given in "Rate distortion optimization for Video Compression", Gary Sullivan and Thomas Wiegand, IEEE Signal Processing Magazine 1998.

FIG. 7a illustrates an example of an implementation of steps 400 and 410 of FIG. 4 when rate distortion optimization is employed. In the implementation of FIG. 7a, step 400 comprises steps 700 and 705. In step 700, a rate distortion index $RD_i$ is calculated for each of the available re-orderings, including the no-re-ordering alternative. In step 705, the rate-distortion index $RD_0$ of the no-re-ordering alternative is then compared to the $RD_i$: s of the available re-orderings. If $RD_0$ is more favourable than any of the other $RD_i$: s, then the "no" path of step 400 is taken. If there is at least one $RD_i$ which is more favourable than $RD_0$, however, then the "yes" path of step 400 is taken and step 410 is entered. Step 410 of FIG. 7a comprises a step 710, wherein the re-ordering is selected for which the most favourable $RD_i$ was achieved in step 700. In practice, steps 400 and 410 of FIG. 7a would typically be performed as one step, where step 705 would be omitted.

When calculating the rate distortion index $RD_i$ of a re-ordering alternative, the encoding steps required to generate the encoded data image 500 have to be performed by the encoder 130, as well as the steps required in order to re-construct (an approximation of) the original image in step 265 (cf. the steps performed by the decoder 115 in FIGS. 3 and 4). Hence, rate-distortion optimization often gives accurate results, but is comparatively processing power demanding.

If there is no or little time pressure on the encoding of images performed by encoder 130, rate-distortion optimization in relation to different re-orderings could be performed for different available predictions, so that the best prediction/re-ordering combination could be selected.

A more processing efficient analysis of whether the application of a certain re-ordering to a particular RB would be beneficial could be based on the fact that the total energy of the transformed block will not be affected by a re-ordering performed prior to application of the transform. Although less processing requiring, such analysis will often yield sufficient accuracy in estimating whether a re-ordering would be beneficial or not, and could for example be suitable if the encoder is operating in real time. The concept is outlined below.

A re-ordering performed prior to the transform will re-distribute the energy within the transformed block, but not necessarily alter the total energy of the TB. Depending on the energy distribution within the original RB, the re-ordering which will result in the most efficient encoding will differ from RB to RB. A certain re-ordering will typically be applied to a RB in order to achieve a concentration of the TB energy to a certain part of the TB, for example to the low energy coefficients of the TB. Hence, in order to estimate the efficiency of a particular re-ordering when applied to a particular RB, it is often sufficient to check whether the energy, in the part of the TB to which the particular re-ordering strives to focus the TB energy, has increased—a comparison could for example be made between the energy of this part of the TB and an energy threshold. Thus, an evaluation of a re-ordering when applied to a certain RB could be performed by calculating the transform coefficients of a part of the TB after the re-ordering has been performed, where a high coefficient energy corresponds to a high absolute value of the transform coefficient. A transform coefficient TB(v,w) of a transformed block TB may, in case of a spatial transform, be described by the scalar product of a 2D basis function $B_{v,w}$ and the resource block RB and may be derived by use of the following expression:

$$TB(v, w) = \sum_{i=0}^{m-1} \sum_{j=0}^{n-1} B_{v,w}(i, j) \cdot RB(i, j), \quad (2)$$

where m×n is the block size.

A flowchart is shown in FIG. 7b illustrating an implementation of an embodiment wherein the analysis of step 400 and 405 is performed in terms of such TB coefficient energy analysis is shown in FIG. 7b. In this implementation, step 400 comprises steps 715 and 720. In step 720, the TB coefficient $TB_i(v,w)$ of at least one position (v,w) is calculated, for at least one re-ordering i, by use of expression (2) (or a corresponding expression if the basis functions of the transform have a higher dimension than two), where the position (v,w) represents a position to which the re-ordering i is expected to concentrate the TB energy. In step 720, the energy of the TB coefficient(s) $TB_i(v,w)$ yielded by the different re-ordering(s) i is compared to the energy of the TB coefficient(s) $TB_0(v,w)$ of the no-re-ordering alternative for the same position(s) (v,w). If the energy TB(v,w) of any of the available re-orderings is higher than the energy obtained if no re-ordering had been performed, then it may be assumed that a re-ordering would be beneficial. If desired, the difference in energy between TB coefficients obtained by a re-ordering i and the no-re-ordering alternative could be compared to an energy difference threshold, in order to ensure that sufficient coding efficiency increase will be obtained by the re-ordering. As shown in step 720 of FIG. 7b, the comparison could be performed between sums of the absolute value of the coefficient magnitudes for a re-ordering and the no-re-ordering alternative, respectively, if the energy of more than one position (v,w) has been calculated in step 715.

In step 410, if entered, the re-ordering yielding the highest increase in $TB_i(v,w)$-energy could for example be selected. If the TB(v,w)-energy has been calculated for a different number of coefficient positions for different re-orderings, a relative increase in energy could be used as a basis for the selection.

Alternatively, the different values of $TB_i(v,w)$ could be calculated in step 715 for positions (v,w) from which the re-ordering is expected to drain energy, i.e. for which coefficients of low absolute magnitude are expected. A re-ordering (possibly the no-re-ordering alternative) yielding the lowest energy would then be selected.

In some implementations, a re-ordering specific analysis could be performed in step 400-410 when selecting a re-ordering (or the no-re-ordering alternative). For example, in order to evaluate the re-ordering illustrated by FIG. 6b, it could be checked whether the following inequality holds:

$$|\Sigma_{i=odd}[\Sigma_j a_{ij}] - \Sigma_{i=even}[\Sigma_j a_{ij}]| > |\Sigma_{i=1}^{n/2}[\Sigma_j a_{ij}] - \Sigma_{i=n/2+1}^{n}[\Sigma_j a_{ij}]| \quad (3).$$

It could for example be decided that the re-ordering should be performed if inequality (3) holds, or if the difference between the left hand side and the right hand side of the inequality (3) exceeds a certain threshold. The corresponding column re-arrangement could also be analyzed by the corresponding column inequality. A decision between row or column re-arrangement could be made based on these analyses.

If for example different re-orderings based on line displacement are available, where the elements could be displaced any number of positions within a row (or column), the analysis performed in step 400 could for example include maximizing the absolute residual in the vertical (or horizontal) direction, where the absolute residual is defined as either the absolute value of the sum of the RB elements 615 in a row/column, or the sum of the absolute value of each RB element 615 in a row or column. The re-ordering yielding the highest absolute residual for a column (or row) could for example be selected, or the re-ordering yielding the highest absolute residual for a particular column (or row), mapping onto a particular basis function of the transform.

As illustrated by steps 220 and 245 of FIG. 2, a scanning step is often performed in the encoding of a residual block in the encoder 130, and a corresponding inverse scanning is then performed in the decoder 115. The purpose of the scan is to arrange the elements of a matrix (for example the quantized transformed block QTB) into a one-dimensional array, or vector, format, see for example "*The H.264/AVC Advanced Video Coding Standard: Overview and Introduction to the Fidelity Range Extensions*" cited above. The elements can be scanned in different order (i.e. along different scanning paths), and the scan ordering or path is typically designed to order the highest-variance coefficients first and to maximize the number of consecutive zero-valued coefficients appearing in the scan, thus providing efficient encoding when for example run-length encoding is employed. Since the application of a re-ordering to a residual block 600 will alter the positions of the highest-variance coefficients of the transformed block, the scanning order to be used could in one implementation be linked to the applied re-ordering. For example, the encoder 130 could be pre-configured to select a particular scanning order when a certain re-ordering is selected in step 410, and the decoder 115 could similarly be pre-configured to select the corresponding inverse scanning order when a PRP index pointing to the certain re-ordering is received in the encoded image data 500. Alternatively, the scanning order could be selected on a case-to-case basis, and the encoded image data 500 could include a separate indication pointing to the scanning order used.

In H.264, a zig-zag scanning is performed. The zig-zag scanning is illustrated by FIG. 8a for a 4×4 transform block, wherein the positions of the coefficients of a (quantised) transformed block 800 have been numbered 0-15. The scan is started at the coefficient having position 15, and the scan is then performed to form a vector of quantized transform coefficients (SV) having descending positions: [pos 15, pos 14, pos 13, . . . , pos 0]. This zig-zag scanning path could be used also when re-ordering is employed, and may be beneficial for some re-orderings. For other re-orderings, other scanning paths may be more beneficial, depending on to which part of the TB the re-ordering is expected to concentrate the TB energy. For example, for row wise re-orderings aiming to concentrate the non-zero elements of the re-ordered residual block to the lower frequency positions, such as for example the re-orderings shown in FIGS. 6a and 6b, it is often beneficial to employ a row-wise scanning path according to the example given in FIG. 8b, where the coefficient positions are again numbered according to where in the SV vector the coefficients will appear. A scanning path which is beneficial for a particular combination of re-ordering and transform may be found for example by determining the probability for a non-zero coefficient at the different positions of in a transformed block based on the encoding of a large number of original blocks, obtained for example by simulation.

The size of the residual block for which re-ordering can be performed prior to applying a transform can for example correspond to the size of the transform matrix to be applied. Hence, if the transform is a 4×4-transform, the re-ordering could in this embodiment be performed on a 4×4 block size level. In some encoder embodiments, the size of the applied transform can vary between different blocks of a sequence of images. In such encoders, the size of the block onto which a re-ordering can be performed could be adjusted to the size of the currently applied transform.

In one embodiment, wherein the size of the block for which a re-ordering can be performed corresponds to the size of the transform matrix, the decision as to which re-ordering, if any, to use can be performed as a joint decision applying to a group of consecutive residual blocks 600. Such decision can be signaled once per group of consecutive residual blocks 600. In one implementation, decoder 115 will perform, when the decoder 115 receives such group PRP index, the inverse re-ordering (if any) corresponding to the received PRP index to all blocks in the group of consecutive blocks 600. In another implementation, a re-ordering can be selected on a group level from a set of available re-orderings, while signalling indicating whether or not the selected re-ordering has been applied to the RBs of the group can be included in the encoded image data in an individual RB basis. An advantage of group PRP indexing is that less bandwidth is required for the signalling of the PRP index. In one implementation, the encoder 130 can alternate between group decisions and re-ordering decisions applying to single blocks.

Figures 9A, 9B:
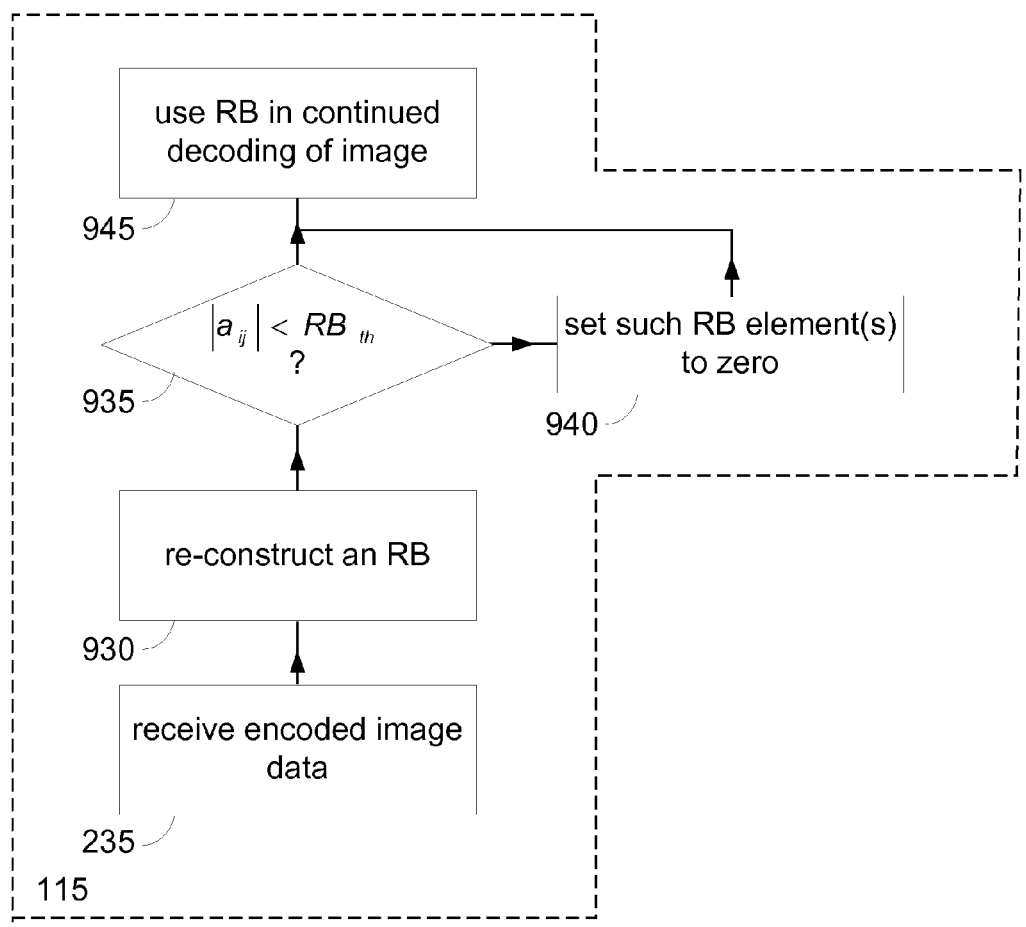
FIG. 9a illustrates an example of a ringing replacement operation performed in order to reduce undesired ringing.
FIG. 9b is flowchart illustrating an embodiment of identification of RB elements that can be set to a constant value in a ringing replacement operation.

In the decoder 115, when a residual block 600 is encoded and decoded, for example in the manner described in any of FIGS. 2-4, unwanted ringing sometimes occurs, typically appearing as a set of RB elements 615 of low varying magnitude in the re-constructed residual block, where the original residual block had a constant value (for example zero). In one embodiment of the decoder 115, the decoder is configured to assign a constant value to the RB elements 615 which are assumed to contain unwanted ringing. An example of such ringing replacement operation as applied to a residual block is shown in FIG. 9a. An original residual block 900 is shown, as well as a re-constructed residual block 905. Arrow 910 denotes a set of encoding and decoding steps, such as for example steps 300, 210-225, 240-255 and step 305. The re-constructed RB 905 corresponds to the original RB 900, but a ringing has appeared in the two last rows of the RB 905. By applying a ringing replacement operation 915 to the re-constructed RB 905, wherein the value of RB elements 615 suspected to contain ringing is replaced by a constant value (here: zero), resulting in a ringing-reduced residual block 920, a better correspondence with the original RB 900 is achieved. The constant value could for example be zero, as in the example of FIG. 9a, or correspond to the average value of the RB.

A decision as to whether or not to apply a ringing replacement operation 915 to a re-constructed RB 905 can for example be based on an analysis of the values of the RB elements 615 of the re-constructed RB 905. An example of such analysis as performed by the decoder 115 is shown in FIG. 9b, where the constant value is zero. In step 235, encoded image data is received in the decoder 115. In step 930, a residual block is reconstructed by performing the inverse of the encoding steps applied by the encoder 130, e.g. steps 240-255 and 305. Step 935 is then entered, wherein it is checked whether the absolute magnitude, $|a_{ij}|$, of at least one of the RB elements 615 of the re-constructed RB 905 is smaller than a RB element threshold, $RB_{th}$. If not, step 945 is entered, wherein the residual block is used in the continued decoding of the encoded image data. However, if a RB element of absolute magnitude smaller $RB_{th}$ is identified in step 935, then 940 is entered, wherein the value of the RB element(s) of absolute magnitude smaller than $RB_{th}$ is replaced by a constant value (which is zero in the example). The ringing reduced RB can then be used in the continued decoding of the encoded image data of step 445.

The at least one RB elements 615 for which the absolute magnitude is checked in step 935 could for example be an RB element 615 from which the re-ordering having been applied is expected to drain energy. In one embodiment, all RB elements 615 are checked in step 935.

The threshold value $RB_{th}$ could advantageously be set in dependence on the quantization used for the RB element 615, so that a larger value of $RB_{th}$ is used for RB elements 615 to which a lower resolution quantization has been applied.

A ringing replacement operation 915 can be applied to the re-constructed residual block 905 either before or after performing an inverse re-ordering step 305.

Instead of basing the ringing replacement operation on the absolute magnitude of the RB elements 615, a ringing replacement operation 915 could be predefined and linked to a particular re-ordering operation. A particular re-ordering is typically expected to yield constant value- or low-valued RB elements 615 at certain locations, and hence, the RB elements 615 of such locations could be set to a constant value. For example, the ringing replacement operation illustrated in FIG. 9a, wherein the RB elements of the two bottom rows of the re-constructed RB 905 are set to zero, could be linked to the re-ordering illustrated in FIG. 6a (here, the ringing replacement would be performed after re-ordering, or a different ringing replacement operation would be defined). Hence, in this implementation, the decoder 115 could be configured to apply a ringing replacement operation, which is linked to a particular re-ordering, to all received RB 600 to which this re-ordering has been applied.

Figure 10:
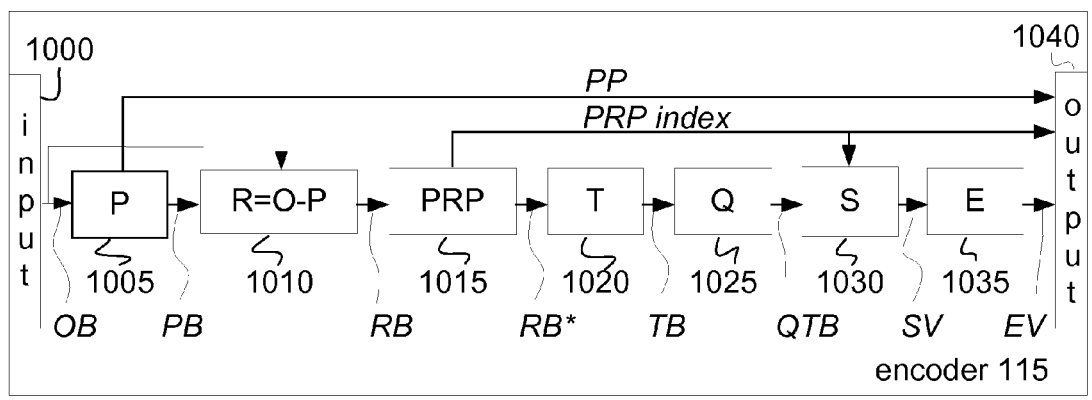
FIG. 10 is a schematic illustration of an embodiment of an encoder employing residual block re-ordering.

FIG. 10 is a schematic illustration of an example of an encoder 130 wherein a pixel re-ordering process is employed in accordance with the above. The encoder 130 of FIG. 10 comprises the following modules: an input 1000, a prediction mechanism 1005, a residual mechanism 1010, a re-ordering mechanism 1015, a transform mechanism 1020, a quantizing mechanism 1025, a scanning mechanism 1030, an entropy encoder 1035 and an output 1040.

Input 1000 is configured to receive a signal indicative of an original image, and to retrieve or generate at least one original block (OB) from a received image. An input of prediction mechanism 1005 is responsively connected to the input 1000 and configured to receive an OB to be encoded.

Prediction mechanism 1005 is configured to generate a prediction block (PB), based on one or more previously encoded past image(s), or previously encoded part(s) of the current image. Prediction mechanism 1005 is further configured to generate a signal indicative of the prediction block and of the prediction parameters. The prediction parameters are provided to the output 1040, either directly or via the intermediate modules.

An input of residual mechanism 1010 is responsively connected to prediction mechanism 1005 and configured to generate, from an original block and a prediction block received from the prediction mechanism 1005, a residual block (RB) indicative of the difference between the OB and the PB. The OB can be received by residual mechanism 1010 from input 1000 either directly, as shown in FIG. 10, or via prediction mechanism 1005.

The re-ordering mechanism 1015, indicated by "PRP" in FIG. 10, is responsively connected to the residual mechanism 1010 and configured to perform a re-ordering of RB elements of a RB, if beneficial. The re-ordering mechanism 1015 is furthermore configured to generate a signal indicative of the re-ordered RB, and a signal indicative of the performed re-ordering (cf. PRP index 515). The operation of re-ordering mechanism 1015 will be further described in relation to FIGS. 12 and 14.

The input of transform mechanism 1020 is responsively connected to the output of re-ordering mechanism 1015, and configured to generate a transformed block, TB, by applying a predetermined transform to a received RB (which may or may not have undergone re-ordering). Quantization mechanism 1025 is responsively connected to transform mechanism 1020, configured to quantize the coefficients of a transformed block received from the transform mechanism 1025 and thereby generate a quantized transformed block.

The scanning mechanism 1030 is responsively connected to the quantization mechanism 1025, and configured to perform scanning of a received quantized transformed block, thereby generating a vector of quantized transform coefficients. In an embodiment wherein the scanning type performed is dependent on the re-ordering, scanning mechanism 1030 is further configured to receive a signal indicative of which re-ordering has been performed. The scanning mechanism 1030 could then receive such signal directly from the re-ordering mechanism 1015, as shown in FIG. 10, or via the quantization mechanism 1025.

Entropy encoder 1035 is responsively connected to the scanning mechanism 1030, and is configured to entropy encode a received vector of quantized transform coefficients (SV), thereby generating an entropy encoded bit-stream (EB). Output 1040 is responsively connected to entropy encoder 1035, and arranged to generate encoded image data 500 to be conveyed to a decoder 115. Output 1040 is further configured to receive the prediction parameters and a PRP index—either via entropy encoder 1035, or directly from the prediction mechanism 1005 and re-ordering mechanism 1015. Output 1040 could for example be further configured to include encoded image data 500 in a file, message or data stream comprising encoded image data 500 relating to further original blocks.

Figure 11:
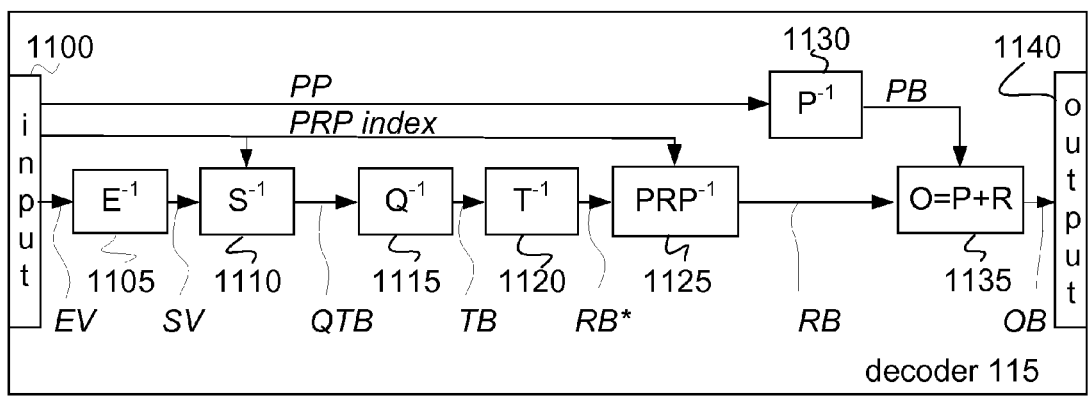

FIG. 11 is a schematic illustration of an example of a decoder 115 wherein an embodiment of an inverse pixel re-ordering process is employed. The decoder 115 of FIG. 11 comprises the following modules: an input 1100, an inverse entropy encoding mechanism 1105, an inverse scanning mechanism 1110, an inverse quantization mechanism 1115, an inverse transform mechanism 1120, an inverse re-ordering mechanism 1125, an inverse prediction mechanism 1130, an original block reconstruction mechanism 1135, and an output 1140. Input 1100 is configured to receive a signal indicative of encoded image data 500, and to retrieve an entropy encoded bit-stream, prediction parameters and a PRP index from received encoded image data 500. Input 1100 is further configured to convey retrieved prediction parameters to the inverse prediction mechanism 1130, a retrieved entropy encoded bit-stream 1105 to the inverse entropy encoding mechanism 1105, and a retrieved PRP index to the inverse re-ordering mechanism 1125 (either directly as shown in FIG. 11, or via the intermediate modules). In an embodiment wherein the scanning is dependent on the used re-ordering, the PRP index will further be provided to the inverse scanning mechanism 1110.

An input of inverse entropy encoding mechanism 1105 is responsively connected to the input 1100, and configured to perform the inverse of the entropy encoding performed by entropy encoder 1035 in order to arrive at a vector of quantized transform coefficients (SV). An input of inverse scanning mechanism 1110 is responsively connected to inverse entropy encoding mechanism 1105 and configured to perform the inverse of the scanning performed by scanning mechanism 1030, thereby generating a quantized transform block (QTB) from an SV vector. If the scanning is dependent on which re-ordering was applied by the re-ordering mechanism 1015, the inverse scanning mechanism 1110 could be further configured to receive the PRP index from the input 1100, and to identify the applicable scanning in dependence on the PRP index prior to performing the inverse scanning, for example by means of an "if clause" in a computer program, or by checking a table.

The inverse quantization mechanism 1115 is responsively connected to inverse scanning mechanism 1110 and configured to generate a transform block (TB) by performing inverse quantization of the quantized transform block. For example, if the quantization step is constant within the possible range of values, inverse quantization could be performed by multiplying the quantized value with the quantization step. The input of inverse transform mechanism 1120 is responsively connected to the output of inverse quantization mechanism 1115, and configured to apply, to a received transformed block, the inverse of the transform applied by the transform mechanism 1020, thereby generating a residual block (RB), which may or may not have been re-ordered by the re-ordering mechanism 1015.

The inverse re-ordering mechanism 1125 is responsively connected to the inverse transform mechanism 1120, and configured to generate a residual block RB wherein the order is the same as in the residual block generated by residual mechanism 1010. The operation of the inverse residual mechanism 1125 is further discussed in relation to FIGS. 13 and 15.

The inverse prediction mechanism 1130 is responsively connected to the input 1100, and configured to use received prediction parameters, together with previously decoded original block(s), to re-construct a prediction block (PB) being a prediction of an original block. The OB re-construction mechanism 1135 is responsively connected to the inverse re-ordering mechanism 1125 and to the inverse prediction mechanism 1130. OB re-construction mechanism is configured to generate a re-construction of an original block from a prediction block received from the inverse prediction mechanism 1130 and a corresponding residual block received from the inverse re-ordering mechanism 1125. Output 1140 is responsively connected to OB re-construction mechanism 1135 and configured to generate a signal indicative of the re-constructed original block, for example to a user interface such as a screen, or to another application.

Generally speaking, the modules 1105, 1110, 1115, 1120, 1125, 1130 and 1135 are all responsively connected to input 1100 of the decoder 115, albeit some of them via intermediate modules.

The encoder 130 of FIG. 10 and the decoder 115 of FIG. 11 are given as examples only. A re-ordering mechanism 1015 could be implemented in encoders 130 employing other encoding mechanisms than those shown in FIG. 10. For example, the quantization mechanism 1025, the scanning mechanism 1030 and the entropy encoding mechanism 1035 could be omitted or replaced by alternative encoding mechanisms. Similarly, an inverse re-ordering mechanism 1125 could be implemented in decoders 115 employing other decoding mechanisms than those shown in FIG. 11.

Figure 12:
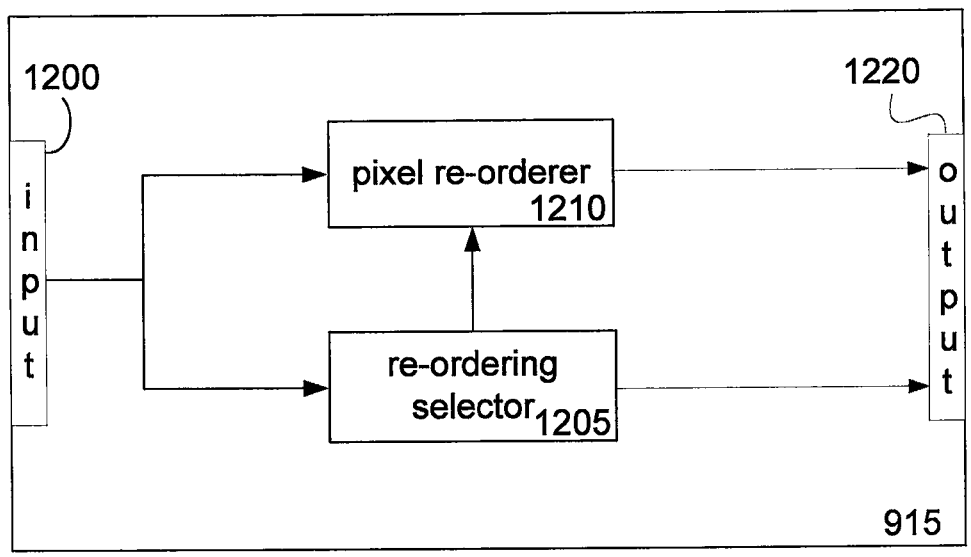
FIG. 12 is a schematic illustration of a re-ordering mechanism to be included in an encoder.

A schematic illustration of an example of a re-ordering mechanism 1015 is shown in FIG. 12. Re-ordering mechanism 1015 of FIG. 12 comprises an input 1200, a re-ordering selector 1205, a pixel re-orderer 1210 and an output 1220. Input 1200 is configured to receive a signal indicative of a residual block RB, for example from a residual mechanism 1010, and to forward this signal to the re-ordering selector 1210 and to the pixel re-orderer 1205.

The re-ordering selector 1205 is responsively connected to the input 1200 and configured to perform steps 400 and 410 of FIG. 4, for example by means of rate-distortion optimization (cf. FIG. 7a), or by means of a simpler analysis as discussed above. The re-ordering selector 1205 is further arranged to generate a signal indicative of the selected re-ordering.

Pixel re-orderer 1210 is responsively connected to the re-ordering selector 1205, and configured to perform the re-ordering process indicated in a signal received from the re-ordering selector (cf. step 300 above). Such signal could for example contain an indication of the performed re-ordering in the form of a PRP index of value p, pointing to re-ordering (or to an inverse re-ordering) which is indexed p. Upon receipt of the PRP index, the pixel re-orderer 1210 could for example find the value p in a PRP index table, wherein different instructions to be executed by pixel re-orderer 1210 upon receipt of different PRP indices are associated with corresponding PRP indices. Alternatively, the receipt of a PRP index could trigger the execution of an "if-clause" of a computer program, e.g., if the PRP index points to the re-ordering shown in FIG. 6a:

"if PRP index p, then, for j:=1-4:

$a'_{1j} := a_{1j};$ $a'_{2j} := a_{4j};$ $a'_{3j} := a_{3j};$ $a'_{4j} := a_{2j};$ where $\{a_{ij}\}$ forms the original RB and $\{a_{ij}\}$ forms the re-ordered RB. The original RB can for example be received by pixel re-orderer 1210 directly from input 1200, as shown in FIG. 12, or via re-ordering selector 1205. Pixel re-orderer 1210 is further arranged to generate a signal indicative of the re-ordered RB.

Output 1220 is responsively connected to the pixel re-orderer 1210, and is arranged to generate a signal indicative of a received re-ordered RB and of a PRP index whereby the applied re-ordering may be identified by a decoder 115—a signal indicative of such PRP index could be received directly from the re-ordering selector as shown in FIG. 12, or via the pixel re-orderer 1210.

The connection between the input 1200 and the pixel re-orderer 1205 can be omitted if the re-ordering selector 1205 is configured to convey, to the pixel re-orderer 1210, a signal indicative of the residual block received from input 1200. Similarly, the connection between the re-ordering selector 1205 and the signal generator 1215 could be omitted if the pixel re-orderer 1210 is configured to convey, to the output 1220, an signal indicative of the applied re-ordering.

Figure 13:
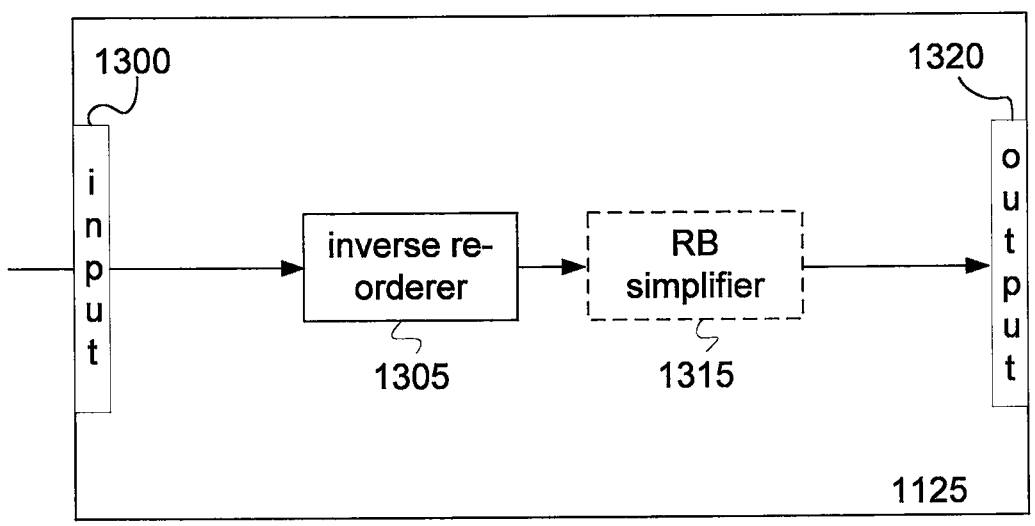
FIG. 13 is a schematic illustration of an inverse re-ordering mechanism to be included in a decoder.

FIG. 13 schematically illustrates an example of an embodiment of an inverse re-ordering mechanism 1125. Inverse re-ordering mechanism 1125 of FIG. 13 comprises an input 1300, an inverse re-orderer 1305 and an output 1320. Inverse re-ordering mechanism 1125 can further optionally include an RB simplifier 1315.

Input 1300 is configured to receive a signal indicative of a residual block (RB) which may or may not have been re-ordered by a re-ordering mechanism 1015, and a signal indicative of a PRP index. Such signals could be part of the same signal, received for example from an inverse transform mechanism, or could be received as two separate signals as shown in FIG. 11. Inverse re-orderer 1305 is responsively connected to input 1300 and configured to use a received signal indicative of a PRP index to identify which re-ordering, if any, has been applied to a residual block (cf. steps 420 and 425 of FIG. 4). Such identification could for example be performed by looking up the received PRP index in a table, or by running an if-clause of a computer program (cf. the discussion in relation to the re-ordering selector). In an implementation wherein the re-ordering was selected by the encoder in dependence on the prediction mode or other encoding parameter, the inverse re-orderer is configured to select the inverse re-ordering in dependence of said other parameter. Inverse re-orderer 1305 is further configured to receive a residual block from input 1300, and to perform the inverse of an identified re-ordering to a received residual block associated with the PRP index by which the re-ordering was identified. Output 1320 is responsively connected to the inverse re-orderer 1305 (possibly via an RB simplifier 1315), and configured to generate a signal indicative of a residual block.

As indicated in FIG. 13, the inverse re-ordering mechanism 1125 could optionally include an RB simplifier 1315, configured to receive a residual block and to identify if any of the RB elements 615 should be set to a constant value, as discussed in relation to FIGS. 9a and 9b. RB simplifier 1315 could for example operate in accordance with the method illustrated in FIG. 9b. An RB simplifier 1315 could be configured to operate on an output signal from the inverse re-orderer 1305, or to operate on an output signal from an inverse transform mechanism 1120.

The different modules of encoder 130, re-ordering mechanism 1015, decoder 115 and inverse re-ordering mechanism 1125 which are described above as configured to perform different tasks are for example programmably configured to perform those tasks. Re-ordering mechanism 1015 and inverse re-ordering mechanism 1125 can for example be implemented by means of a suitable combination of hardware and software configured to perform the procedures as described above. Re-ordering mechanism 1015 could for example be implemented by means of one or more general purpose processors, or one or more processors especially developed for the re-ordering mechanism 1015, in combination with software for performing re-ordering of a residual block (cf. steps 400, 410, 300 and 415 of FIG. 4). Similarly, inverse re-ordering mechanism 1125 could for example be implemented by means of one or more general purpose processors, or one or more processors especially developed for the inverse re-ordering mechanism 1125, in combination with software for performing inverse re-ordering of a residual block (cf. steps 400, 410, 300 and 415 of FIG. 4).

Figure 14:
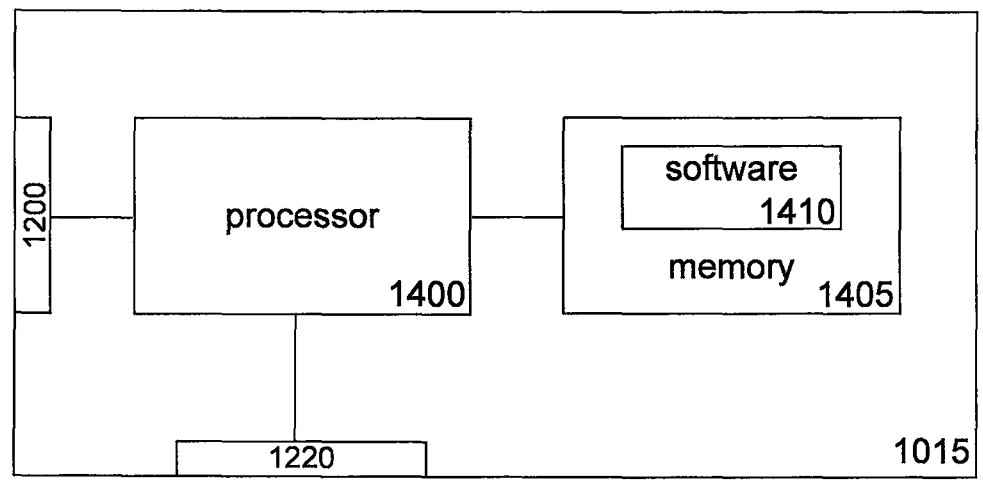
FIG. 14 is an alternative illustration of the re-ordering mechanism of FIG. 12.

FIG. 14 shows an alternative illustration of re-ordering mechanism 1015 wherein re-ordering mechanism 1015 comprises processing means 1400 connected to a computer program product 1405 in the form of a memory, as well as to interfaces 1200 and 1220. The memory comprises computer readable code means that stores a computer program 1410, which when executed by the processing means 1400 causes the re-ordering mechanism 1015 to perform the re-ordering method as described above in relation to FIG. 4 (cf. steps 400, 410, 300, 415). In other words, the re-ordering mechanism 1015, its re-ordering selector 1210 and pixel re-orderer 1210 may in this embodiment be implemented with the help of corresponding program modules of the computer program 1410.

Figure 15:
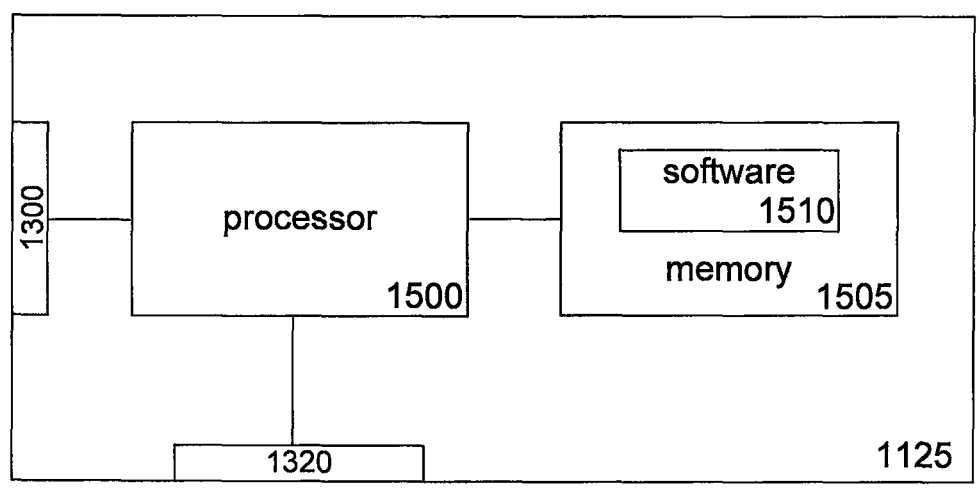
FIG. 15 is an alternative illustration of the inverse re-ordering mechanism of FIG. 13.

Similarly, FIG. 15 shows an alternative illustration of inverse re-ordering mechanism 1125 wherein inverse re-ordering mechanism 1125 comprises processing means 1500 connected to a computer program product 1505 in the form of a memory, as well as to interfaces 1300 and 1320. The memory comprises computer readable code means that stores a computer program 1510, which when executed by the processing means 1500 causes the inverse re-ordering mechanism 1125 to perform the inverse re-ordering method as described above in relation to FIG. 4 (cf. Steps 420, 425 and 305). In other words, the inverse re-ordering mechanism 1125, its inverse re-orderer 1305 and RB simplifier 1315, if applicable, may in this embodiment be implemented with the help of corresponding program modules of the computer program 1510.

The computer program products 1405 and 1505, respectively, could be any type of non-volatile computer readable means, such as a hard drive, a flash memory, an EEPROM (electrically erasable programmable read-only memory) a DVD disc, a CD disc, a USB memory, etc.

A numerical example illustrating an embodiment of the present technology will now be presented. This example uses the separable, integer-based, 8×8 transform T, used in the H.264 standard:

$$T = \begin{bmatrix} 8 & 8 & 8 & 8 & 8 & 8 & 8 & 8 \\ 12 & 10 & 6 & 3 & -3 & -6 & -10 & -12 \\ 8 & 4 & -4 & -8 & -8 & -4 & 4 & 8 \\ 10 & -3 & -12 & -6 & 6 & 12 & 3 & -10 \\ 8 & -8 & -8 & 8 & 8 & -8 & -8 & 8 \\ 6 & -12 & 3 & 10 & -10 & -3 & 12 & -6 \\ 4 & -8 & 8 & -4 & -4 & 8 & -8 & 4 \\ 3 & -6 & 10 & -12 & 12 & -10 & 6 & -30 \end{bmatrix} \quad (4)$$

which is applied on the following original residual block:

$$RB = \begin{bmatrix} 60 & -60 & 0 & 0 & 0 & 0 & 0 & 0 \\ 0 & 60 & -60 & 0 & 0 & 0 & 0 & 0 \\ 0 & 0 & 60 & -60 & 0 & 0 & 0 & 0 \\ 0 & 0 & 0 & 60 & -60 & 0 & 0 & 0 \\ 0 & 0 & 0 & 0 & 60 & -60 & 0 & 0 \\ 0 & 0 & 0 & 0 & 0 & 60 & -60 & 0 \\ 0 & 0 & 0 & 0 & 0 & 0 & 60 & -60 \\ 0 & 0 & 0 & 0 & 0 & 0 & 0 & 60 \end{bmatrix} \quad (5)$$

The complete transformation process in H.264 incorporates scaling and quantization. The quantized transform coefficients for Quantization Parameter QP=34 are shown below:

$$QTB_{H.264} = \begin{bmatrix} 0 & 0 & 0 & 0 & 0 & 0 & 0 & 0 \\ 0 & 0 & 1 & 0 & 0 & 0 & 0 & 0 \\ 0 & -1 & 1 & 1 & 0 & 0 & 0 & 0 \\ 0 & 0 & -1 & 1 & 1 & 0 & 0 & 0 \\ 0 & 0 & 0 & -1 & 2 & 1 & 0 & 0 \\ 0 & 0 & 0 & 0 & -1 & 3 & 1 & 0 \\ 0 & 0 & 0 & 0 & 0 & -1 & 3 & 0 \\ 0 & 0 & 0 & 0 & 0 & 0 & 0 & 4 \end{bmatrix} \quad (6)$$

The coefficients of the quantized transformed block are then entropy encoded.

Decoding of the corresponding encoded image data 500 in a decoder 115 yields the following re-constructed residual block:

$$RB_{H.264} = \begin{bmatrix} 33 & -48 & -2 & -6 & -2 & 1 & 7 & 15 \\ -19 & 61 & -56 & -9 & 6 & 0 & 10 & 7 \\ 5 & -4 & 60 & -61 & -5 & 4 & 0 & 1 \\ -3 & 0 & -2 & 69 & -62 & -5 & 6 & -2 \\ -1 & -3 & 11 & 1 & 69 & -61 & -9 & -6 \\ -10 & 9 & -9 & 11 & -2 & 60 & -56 & -2 \\ 0 & -17 & 9 & -3 & 0 & -4 & 61 & -45 \\ -4 & -1 & -10 & -2 & -3 & 5 & -19 & 33 \end{bmatrix} \quad (7)$$

If a row-displacement rotation corresponding to a 45 degree clock-wise rotation is performed on the RB shown in expression (5), the encoding and decoding will result in a decoded RB which better corresponds to the original RB. The re-ordered RB will then be as follows:

$$RB^{PRP} = \begin{bmatrix} 0 & 0 & 0 & 60 & -60 & 0 & 0 & 0 \\ 0 & 0 & 0 & 60 & -60 & 0 & 0 & 0 \\ 0 & 0 & 0 & 60 & -60 & 0 & 0 & 0 \\ 0 & 0 & 0 & 60 & -60 & 0 & 0 & 0 \\ 0 & 0 & 0 & 60 & -60 & 0 & 0 & 0 \\ 0 & 0 & 0 & 60 & -60 & 0 & 0 & 0 \\ 0 & 0 & 0 & 60 & -60 & 0 & 0 & 0 \\ 0 & 0 & 0 & 60 & 0 & 0 & 0 & 0 \end{bmatrix}, \quad (8)$$

and the following quantized transform block will be obtained:

$$QTB_{H.264}^{PRP} = \begin{bmatrix} 0 & 1 & 0 & -2 & 0 & 4 & 0 & -5 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \quad (7)$$

These coefficients are then entropy encoded. Inverse quantization and inverse transformation results in the following re-constructed (re-ordered) RB:

$$RB_{H.264}^{PRP} = \begin{bmatrix} 1 & -1 & -4 & 54 & -54 & 4 & 1 & 0 \\ 0 & -1 & -4 & 54 & -54 & 4 & 1 & 0 \\ 1 & -1 & -4 & 54 & -54 & 4 & 1 & 0 \\ 0 & -1 & -4 & 54 & -54 & 4 & 1 & 0 \\ 1 & -1 & -4 & 54 & -54 & 4 & 1 & 0 \\ 0 & -1 & -4 & 54 & -54 & 4 & 1 & 0 \\ 1 & -1 & -4 & 54 & -54 & 4 & 1 & 0 \\ 0 & -1 & -4 & 54 & -54 & 4 & 1 & 0 \end{bmatrix} \quad (8)$$

Inverse re-ordering will result in the following re-created residual block:

$$RB_{H.264}^{IPRP} = \begin{bmatrix} 54 & -54 & 4 & 1 & 0 & 0 & 0 & 0 \\ -4 & 54 & -54 & 4 & 1 & 0 & 0 & 0 \\ -1 & -4 & 54 & -54 & 4 & 1 & 0 & 0 \\ 0 & -1 & -4 & 54 & -54 & 4 & 1 & 0 \\ 0 & 1 & -1 & -4 & 54 & -54 & 4 & 1 \\ 0 & 0 & 0 & -1 & -4 & 54 & -54 & 4 \\ 0 & 0 & 0 & 1 & -1 & -4 & 54 & -54 \\ 0 & 0 & 0 & 0 & 0 & -1 & -4 & 54 \end{bmatrix}$$

It can be seen that the re-created residual block $RB_{H.264}^{IPRP}$ obtained when re-ordering is applied is more similar to the original residual block RB than the re-created residual block $RB_{H.264}$ obtained without re-ordering. In fact, the peak-signal-to-noise ratio (PSNR) of $RB_{H.264}^{IPRP}$ is 31.4 dB and the PSNR of $RB_{H.264}$ is 23.4 dB. Thus, an improvement of 8 dB is achieved in the above example.

By performing re-ordering of the RB elements of a residual block as described above, an improved encoding efficiency can be achieved when the re-ordered RB exhibits a better mapping on one or a few of the basis functions of the transform than the original RB. By providing an encoder with the possibility to select whether or not to apply an available re-ordering procedure, and possibly also to select a re-ordering procedure from a set of re-ordering procedures, a residual block can be adjusted to the applied transform prior to transformation on a block-to-block basis. The re-ordering procedure works equally well for separable and non-separable transforms.

The above described encoder technology could for example be used in a professional encoder for broadcast video, in encoders in user devices such as video cameras, in encoders for video conferencing applications, in encoders in medical scan devices, etc. The described decoder technology could for example be used in user devices such as mobile telephones, computers, television sets, dvd players, video conferencing devices, medical scan viewing devices, etc.

Although various aspects of the invention are set out in the accompanying independent claims, other aspects of the invention include the combination of any features presented in the above description and/or in the accompanying claims, and not solely the combinations explicitly set out in the accompanying claims.

One skilled in the art will appreciate that the technology presented herein is not limited to the embodiments disclosed in the accompanying drawings and the foregoing detailed description, which are presented for purposes of illustration only, but it can be implemented in a number of different ways, and it is defined by the following claims.

The invention claimed is:

1. An encoding method for encoding a representation of an image, the method comprising:
    creating, in an encoder, a residual block from an original block and a prediction block which is an approximation of the original block, wherein the created residual block comprises residual block elements;
    re-ordering, in the encoder, the residual block elements within the residual block;
    applying, in the encoder, a transform to the re-ordered residual block; and
    generating a signal, indicative of the performed re-ordering, to be conveyed to a decoder;
    selecting one re-ordering to be available to a set of consecutive residual blocks; and
    including, in the generated signal, an indication of the selected re-ordering pointing to the set of consecutive residual blocks,
    wherein the indication of the selected re-ordering pointing to the set of consecutive residual blocks is signaled in the generated signal once per the set of consecutive residual blocks.

2. The encoding method of claim 1 further comprising determining, in the encoder, prior to applying the transform to a residual block, whether or not to prevent re-ordering of the residual block elements of the residual block.

3. The encoding method of claim 1, further comprising:
    analyzing the residual block and generating an analysis result; and
    selecting re-ordering from a set of available re-orderings in response to the analysis result.

4. The encoding method of claim 3, wherein the analyzing comprises:
    identifying a set of available re-orderings of the residual block elements of the residual block;
    determining the rate distortion of each available re-ordering in the set;
    selecting a re-ordering in response to the determined rate distortion of the available re-orderings; and wherein
    the re-ordering includes re-ordering the residual block elements according to the selected re-ordering.

5. The encoding method claim 1, further comprising:
    determining the magnitude of at least one coefficient of a transform block that would be obtained if a particular re-ordering were to be employed, the position(s) of the coefficient(s) within the transform block being selected in response to the particular re-ordering; and
    determining whether re-ordering is to be performed in accordance with the particular re-ordering in response to the determined magnitude of the at least one coefficient.

6. The encoding method of claim 1, further comprising
    identifying a prediction mode used in creation of the prediction block;
    selecting a re-ordering in dependence of the identified prediction mode; and wherein
    the re-ordering includes re-ordering the residual block elements according to the selected re-ordering.

7. The encoding method of claim 1, wherein
    the re-ordering includes displacement of the residual elements of at least one row or column internally within the row or column.

8. The encoding method of claim 1, wherein
    the re-ordering includes a re-arrangement of the rows or columns within the residual block.

9. The method of claim 1, wherein the application of the transform on the re-ordered residual block yields a matrix of transform coefficients, the method further comprising:
    scanning of the transform coefficients to form a vector of transformed coefficients; wherein
    the scanning path is selected in response to the re-ordering performed on the residual block.

10. The method of claim 1, wherein the re-ordering is performed on a residual block having the same size as a matrix defining the transform.

11. A decoding method for decoding of encoded image data representing an image, the method comprising:
    deriving, in a decoder, a transformed block from received encoded image data, where the transformed block originates from a transform having been applied, in an encoder, to an original residual block comprising residual block elements;
    deriving, in the decoder, a residual block by applying, to the transformed block, an inverse of said transform;
    performing, in the decoder, an inverse re-ordering of the residual block elements of the derived residual block, wherein a re-ordering has been performed on the original residual block in the encoder prior to applying the transform, the inverse re-ordering comprising retrieving from a signal comprising an indication of a re-ordering performed by the encoder, an indication of the re-ordering, and identifying the inverse re-ordering in response to said indication of the re-ordering;

using, in the decoder, the inversely re-ordered residual block in a re-construction of an original block representing at least a part of an image; and
receiving a signal comprising an indication of a set of consecutive residual blocks to which the same re-ordering was available in the encoder;
wherein the same inverse re-ordering is performed on any residual blocks of the set, to which a re-ordering was performed in the encoder, and
wherein the indication of the set of consecutive residual blocks to which the same re-ordering was available in the encoder is received once per the set of consecutive residual blocks.

12. The decoding method of claim 11, further comprising:
receiving, in the decoder, a signal indicative of the re-ordering having been performed on the original residual block in the encoder prior to applying the transform; and
identifying in the decoder, in response to the signal indicative of the re-ordering, the inverse re-ordering to be performed on the derived residual block.

13. The decoding method of claim 11, further comprising:
receiving, in the decoder, a signal indicative of a prediction mode having been used in the encoder for obtaining a prediction block by which the original residual block was derived; and
identifying, in the decoder, by in response to the signal indicative of the prediction mode, the inverse re-ordering to be performed on the derived residual block.

14. The decoding method of claim 11, wherein:
the deriving of the transformed block comprises performing, on a vector of transform coefficients derived from the encoded image data, an inverse of a scanning performed by the decoder, wherein the inverse scanning to be performed is associated with the inverse re-ordering to be performed on the derived residual block.

15. The decoding method of claim 11, wherein
the inverse re-ordering is a re-arrangement of the rows or columns of the residual block.

16. The decoding method of claim 11, wherein
the inverse re-ordering involves displacing the residual block elements of at least one row or column of the residual block within the row or column.

17. The decoding method of claim 11, wherein
the inverse re-ordering is performed on a residual block having the same size as a matrix defining the inverse transform.

18. The decoding method of claim 11, further comprising:
setting the value of at least one residual block element of the residual block to a constant value prior to using the residual block in the reconstruction of the original block in order to reduce ringing.

19. An encoder adapted to encode a representation of an image into encoded image data, the encoder comprising:
an input configured to receive a signal indicative an original block representing at least a part of an image;
a residual block generator, responsively connected to the input and programmably configured to generate a residual block using a received original block;
a re-ordering mechanism, responsively connected to the residual block generator, programmably configured to select one re-ordering to be available to a set of consecutive residual blocks and to re-order the residual block elements of a residual block according to the selected one re-ordering, thereby creating a re-ordered residual block, wherein the re-ordering mechanism is programmably configured to generate a signal indicative of the selected re-ordering pointing to the set of consecutive residual blocks, the re-ordered residual block and of the performed re-ordering, to be conveyed to a decoder, wherein the signal indicative of the selected re-ordering pointing to the set of consecutive residual blocks is signaled once per the set of consecutive residual blocks;
a transform mechanism, responsively connected to the residual block generator and programmably configured to apply a transform to a received re-ordered residual block, thereby generating a transformed block to be used in the creation of the encoded image data; and
an output connected to the transform mechanism and configured to deliver encoded image data.

20. The encoder of claim 19, wherein
the re-ordering mechanism is configured to determine whether or not a re-ordering of the residual block elements of a received residual block should be performed.

21. The encoder of claim 19, wherein
the re-ordering mechanism comprises a re-ordering selector responsively connected to the residual block generator and programmably configured to select a re-ordering to be applied to a residual block based on an analysis of the residual block, and to generate a signal indicative of the selected re-ordering.

22. The encoder of claim 21, wherein
the re-ordering selector is programmably configured:
to identify a set of available re-orderings;
to determine the rate distortion of each available re-ordering in the set; and
to select a re-ordering from the set in response to the determined rate distortion of the re-orderings of the set.

23. The encoder of claim 19, wherein the encoder further comprises:
a scanning mechanism programmably configured to scan the coefficients of the transform block along a scanning path in order to form a vector of transformed coefficients; wherein
the scanning mechanism is programmably configured to select a scanning path in dependence of a re-ordering performed on the residual block by the re-ordering mechanism.

24. A user device arranged to receive a representation of at least one image from a content creator and to generate an encoded media representation from the received representation of at least one image, the user device comprising an encoder according to claim 19.

25. A media communications system for communication of media to user devices, the media communications system comprising an encoder according to claim 19.

26. A decoder adapted to receive encoded image data representing an image having been encoded by an encoder the decoder comprising:
an input configured to receive encoded image data from which a transformed block may be derived, where the transformed block originates from a transform having been applied, in the encoder, to a residual block comprising residual block elements;
an inverse transform mechanism responsively connected to receive a transformed block and programmably configured to apply an inverse of said transform to the transformed block in order to arrive at a residual block comprising residual block elements;
an inverse re-ordering mechanism, responsively connected to the inverse transform mechanism and programmably configured to receive a residual block, to identify a re-ordering having been performed in the encoder on a corresponding original residual block, and to perform an inverse re-ordering to the received residual block, where the inverse re-ordering is associated with the re-ordering performed in the encoder, thereby generating an inversely re-ordered residual block, and wherein the inverse re-ordering mechanism comprises an inverse re-orderer programmably configured to retrieve, from a signal comprising an indication of a re-ordering performed by the encoder, an indication of the re-ordering including a set of consecutive residual blocks to which the same re-ordering was available in the encoder; and to identify the inverse re-ordering based on said indication of the re-ordering, the decoder further comprising:

an inverse prediction mechanism responsively connected to the inverse re-ordering mechanism and programmably configured to perform the same inverse re-ordering to any residual blocks of the set, to which a re-ordering was performed in the encoder, and to use an inversely re-ordered residual block in the reconstruction of a corresponding original block representing at least a part of an image;

wherein the indication of the set of consecutive residual blocks to which the same re-ordering was available in the encoder is retrieved once per the set of consecutive residual blocks.

27. The decoder of claim 26, wherein
an inverse re-orderer is further programmably configured to:
retrieve an indication of a prediction mode, employed in the encoder upon generation of a prediction block by use of which the original residual block was derived, from a signal indicating the employed prediction mode; and
identify the inverse re-ordering by in response to said indication of the employed prediction mode.

28. The decoder of claim 26, wherein
the re-ordering mechanism further comprises a residual block simplifier responsively connected to receive a residual block and programmably configured to identify if any of the residual block elements of a received residual block should be set to a constant value, and if so, set the value of the identified residual block element(s) to a constant value prior to conveying the residual block to the inverse prediction mechanism.

29. A user device arranged to visualize images on a screen, the user device comprising the decoder of claim 26.

30. An encoder computer program on a tangible non-transitory computer readable media, the computer program comprising computer readable code which, when run on an encoder and in response to receipt of an original block, causes the encoder to:

create a residual block from an original block and a prediction block which is an approximation of the original block, wherein the residual block comprises residual block elements:
re-order the residual block elements within the residual block; and
apply a transform to the re-ordered residual block;
generate a signal, indicative of the performed re-ordering, to be conveyed to a decoder;
select one re-ordering to be available to a set of consecutive residual blocks; and
include, in the generated signal, an indication of the selected re-ordering pointing to the set of consecutive residual blocks,
wherein the indication of the selected re-ordering pointing to the set of consecutive residual blocks is included in the generated signal once per the set of consecutive residual blocks.

31. A decoder computer program on a tangible non-transitory computer readable media, the computer program comprising computer readable code which, when run on a decoder and in response to receipt of a transformed block originating from a transform having been applied, in an encoder, to an original residual block comprising residual block elements, causes the decoder to:
re-construct a residual block by applying, to the transform coefficients matrix, an inverse of the transform;
perform an inverse re-ordering of the residual block elements of the reconstructed residual block, the inverse re-ordering being associated with a re-ordering having been performed on the original residual block prior to applying the transform, and comprising retrieving from a signal comprising an indication of a re-ordering performed by the encoder, an indication of the re-ordering, and identifying the inverse re-ordering based on said indication; and
use the inversely re-ordered residual block in a re-construction of an original block representing at least a part of an image,
wherein the signal comprising an indication of a re-ordering performed by the encoder comprises an indication of a set of consecutive residual blocks to which the same re-ordering was available in the encoder; and
wherein a same inverse re-ordering is performed on any residual blocks of the set, to which a re-ordering was performed in the encoder;
wherein the indication of the set of consecutive residual blocks to which the same re-ordering was available in the encoder is retrieved once per the set of consecutive residual blocks.

* * * * *

UNITED STATES PATENT AND TRADEMARK OFFICE
CERTIFICATE OF CORRECTION

PATENT NO. : 8,971,655 B2  
APPLICATION NO. : 13/383346  
DATED : March 3, 2015  
INVENTOR(S) : Andersson et al.

Page 1 of 1

It is certified that error appears in the above-identified patent and that said Letters Patent is hereby corrected as shown below:

In the specification

In Column 6, Line 59, delete "decoder 130" and insert -- decoder 115 --, therefor.

In Column 19, Line 1, delete "mechanism 1025" and insert -- mechanism 1020 --, therefor.

In Column 20, Lines 58-59, delete "selector 1210 and to the pixel re-orderer 1205." and insert -- selector 1205 and to the pixel re-orderer 1210. --, therefor.

In Column 21, Line 23, delete "$\{a_{ij}\}$" and insert -- $\{a'_{ij}\}$ --, therefor.

In Column 21, Line 37, delete "orderer 1205" and insert -- orderer 1210 --, therefor.

In Column 22, Line 49, delete "selector 1210" and insert -- selector 1205 --, therefor.

In Column 23, Line 57, delete "-48" and insert -- -45 --, therefor.

In Column 24, Line 23, delete "(7)" and insert -- (9) --, therefor.

In Column 24, Line 41, delete "(8)" and insert -- (10) --, therefor.

In the claims

In Column 26, Line 17, in Claim 5, delete "method" and insert -- method of --, therefor.

In Column 27, Line 26, in Claim 13, delete "by in" and insert -- in --, therefor.

In Column 29, Line 33, in Claim 27, delete "by in" and insert -- in --, therefor.

Signed and Sealed this  
Twentieth Day of October, 2015

Michelle K. Lee  
*Director of the United States Patent and Trademark Office*